(12) United States Patent
Kurisawa et al.

(10) Patent No.: US 11,466,211 B2
(45) Date of Patent: Oct. 11, 2022

(54) LIQUID CRYSTAL COMPOSITION AND LIQUID CRYSTAL DISPLAY ELEMENT INCLUDING THE SAME

(71) Applicant: DIC CORPORATION, Tokyo (JP)

(72) Inventors: Kazuki Kurisawa, Kita-adachi-gun (JP); Shinji Ogawa, Kita-adachi-gun (JP); Yoshinori Iwashita, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/772,564

(22) PCT Filed: Mar. 26, 2013

(86) PCT No.: PCT/JP2013/058814
§ 371 (c)(1),
(2) Date: Sep. 3, 2015

(87) PCT Pub. No.: WO2014/155534
PCT Pub. Date: Oct. 2, 2014

(65) Prior Publication Data
US 2016/0017227 A1 Jan. 21, 2016

(51) Int. Cl.
*C09K 19/30* (2006.01)
*C09K 19/44* (2006.01)
(Continued)

(52) U.S. Cl.
CPC .......... *C09K 19/3003* (2013.01); *C09K 19/12* (2013.01); *C09K 19/3001* (2013.01);
(Continued)

(58) Field of Classification Search
CPC ................ C09K 19/12; C09K 19/3001; C09K 19/3003; C09K 2019/122;
(Continued)

(56) References Cited

U.S. PATENT DOCUMENTS

| 5,311,041 A | 5/1994 | Tominaga et al. |
| 9,260,661 B2 | 2/2016 | Sudo et al. |
| (Continued) | | |

FOREIGN PATENT DOCUMENTS

| CN | 101133009 A | 2/2008 |
| CN | 101273110 A | 9/2008 |
| (Continued) | | |

OTHER PUBLICATIONS

English Translation of CN101519594.*

(Continued)

*Primary Examiner* — Chanceity N Robinson
*Assistant Examiner* — Anna Malloy
(74) *Attorney, Agent, or Firm* — WHDA, LLP

(57) ABSTRACT

An object of the present invention is to provide a liquid crystal composition suitable for producing liquid crystal display elements which reduces the risk of the formation of droplet traces during production and allows a liquid crystal material to be ejected at a constant rate during an ODF process without deteriorating the properties of the liquid crystal display element, such as dielectric anisotropy, viscosity, nematic-phase upper-limit temperature, nematic-phase stability at a low temperature, and $\gamma_1$, and the image sticking resistance of the display element, and a liquid crystal display element including the liquid crystal composition. Provided are a liquid crystal composition having a negative dielectric anisotropy, the liquid crystal composition including one or more compounds represented by General Formula (I), one or more compounds represented by General Formula (II), and the compound represented by Formula (IIIb-1) and a liquid crystal display element including the liquid crystal composition.

11 Claims, 2 Drawing Sheets

(51) Int. Cl.
*C09K 19/12* (2006.01)
*C09K 19/54* (2006.01)
*C09K 19/04* (2006.01)

(52) U.S. Cl.
CPC ............ *C09K 19/44* (2013.01); *C09K 19/542* (2013.01); *C09K 2019/0448* (2013.01); *C09K 2019/0451* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3027* (2013.01); *C09K 2019/548* (2013.01)

(58) Field of Classification Search
CPC ...... C09K 2019/3004; C09K 2019/301; C09K 2019/3016; C09K 2019/3027; C09K 2019/123; C09K 2019/0451; C09K 2019/3009
See application file for complete search history.

(56) References Cited

U.S. PATENT DOCUMENTS

| | | | |
|---|---|---|---|
| 2003/0071244 A1* | 4/2003 | Klasen-Memmer | C07C 13/18 252/299.66 |
| 2006/0198968 A1 | 9/2006 | Goto et al. | |
| 2008/0011984 A1 | 1/2008 | Fujita et al. | |
| 2008/0193681 A1* | 8/2008 | Klasen-Memmer | C09K 19/32 428/1.1 |
| 2008/0308768 A1 | 12/2008 | Klasen-Memmer et al. | |
| 2008/0315157 A1 | 12/2008 | Klasen-Memmer et al. | |
| 2009/0090892 A1 | 4/2009 | Fujita et al. | |
| 2009/0103011 A1* | 4/2009 | Bernatz | C09K 19/12 349/86 |
| 2009/0264683 A1 | 10/2009 | Goto et al. | |
| 2009/0268150 A1 | 10/2009 | Hattori et al. | |
| 2010/0134751 A1 | 6/2010 | Klasen-Memmer et al. | |
| 2010/0181532 A1 | 7/2010 | Hattori et al. | |
| 2011/0089373 A1 | 4/2011 | Yanai et al. | |
| 2011/0096285 A1 | 4/2011 | Saito | |
| 2011/0149226 A1 | 6/2011 | Saito et al. | |
| 2011/0155953 A1 | 6/2011 | Hattori et al. | |
| 2011/0278501 A1 | 11/2011 | Hattori et al. | |
| 2012/0161072 A1 | 6/2012 | Saito et al. | |
| 2012/0268706 A1* | 10/2012 | Goebel | C09K 19/3483 349/143 |
| 2013/0001469 A1 | 1/2013 | Hattori et al. | |
| 2013/0021568 A1 | 1/2013 | Hsieh et al. | |
| 2013/0062559 A1 | 3/2013 | Hattori et al. | |
| 2013/0062560 A1* | 3/2013 | Hattori | C09K 19/3402 252/299.61 |
| 2013/0135575 A1* | 5/2013 | Gotoh | C09K 19/14 349/183 |
| 2013/0183460 A1* | 7/2013 | Klasen-Memmer | C09K 19/062 428/1.4 |
| 2013/0248763 A1 | 9/2013 | Goebel et al. | |
| 2013/0258268 A1* | 10/2013 | Goebel | C09K 19/3003 349/186 |
| 2013/0335693 A1 | 12/2013 | Klassen-Memmer et al. | |
| 2014/0028964 A1 | 1/2014 | Klasen-Memmer et al. | |
| 2014/0097383 A1* | 4/2014 | Furusato | C09K 19/3003 252/299.61 |
| 2014/0110630 A1* | 4/2014 | Goebel | C09K 19/12 252/299.5 |
| 2014/0138581 A1* | 5/2014 | Archetti | C09K 19/56 252/299.61 |
| 2014/0139786 A1* | 5/2014 | Engel | C09K 19/56 349/84 |
| 2014/0339472 A1* | 11/2014 | Saigusa | C09K 19/12 252/299.61 |
| 2015/0146155 A1* | 5/2015 | Engel | C09K 19/12 349/183 |
| 2015/0218450 A1 | 8/2015 | Sudo et al. | |
| 2016/0068752 A1 | 3/2016 | Iwashita et al. | |
| 2016/0108316 A1 | 4/2016 | Kurisawa et al. | |
| 2017/0321122 A1 | 11/2017 | Kurisawa et al. | |

FOREIGN PATENT DOCUMENTS

| | | | |
|---|---|---|---|
| CN | 101326263 A | | 12/2008 |
| CN | 101356251 A | | 1/2009 |
| CN | 101495598 A | | 7/2009 |
| CN | 101519594 A | * | 9/2009 |
| CN | 101864318 A | | 10/2010 |
| CN | 102131897 A | | 7/2011 |
| CN | 102144017 A | | 8/2011 |
| CN | 102167655 A | | 8/2011 |
| CN | 102604648 A | | 7/2012 |
| CN | 102834487 A | | 12/2012 |
| CN | 102918135 A | | 2/2013 |
| CN | 104428396 A | | 3/2015 |
| CN | 104797687 A | | 7/2015 |
| CN | 107850809 A | | 3/2018 |
| EP | 1873134 A1 | | 1/2008 |
| EP | 1889894 A1 | | 2/2008 |
| EP | 2578665 A1 | | 4/2013 |
| EP | 2883935 A1 | | 6/2015 |
| EP | 2955570 A1 | | 12/2015 |
| EP | 2977427 A1 | | 1/2016 |
| JP | 6-235925 A | | 8/1994 |
| JP | 10036847 A | * | 2/1998 |
| JP | 2002-357830 A | | 12/2002 |
| JP | 2004-153915 A | | 5/2004 |
| JP | 2006-58755 A | | 3/2006 |
| JP | 2008-031432 A | | 2/2008 |
| JP | 2008-505235 A | | 2/2008 |
| JP | 2010-163559 A | | 7/2010 |
| JP | 2011-089013 A | | 5/2011 |
| JP | 2012-136623 A | | 7/2012 |
| JP | 2014-208852 A | | 11/2014 |
| KR | 10 2007 0107774 A | | 11/2007 |
| KR | 10 2014 0135261 A | | 11/2014 |
| KR | 1020150047618 A | | 5/2015 |
| KR | 10 2015 0074194 A | | 7/2015 |
| KR | 101581889 B1 | | 12/2015 |
| TW | 200632076 A | | 9/2006 |
| TW | 201435065 A | | 9/2014 |
| TW | 201435066 A | | 9/2014 |
| TW | 201804221 A | | 2/2018 |
| TW | 201837556 A | | 10/2018 |
| WO | 2005/123896 A2 | | 12/2005 |
| WO | 2006093189 A1 | | 9/2006 |
| WO | 2010/084810 A1 | | 7/2010 |
| WO | 2011/132451 A | | 10/2011 |
| WO | 2011/148928 A1 | | 12/2011 |
| WO | 2011/152494 A1 | | 12/2011 |
| WO | 2012/130380 A1 | | 10/2012 |
| WO | 2013013427 A1 | | 1/2013 |
| WO | 2013/178333 A1 | | 12/2013 |
| WO | 2014112547 A1 | | 7/2014 |
| WO | 2014123056 A1 | | 8/2014 |
| WO | 2014147792 A1 | | 9/2014 |

OTHER PUBLICATIONS

English translation of JP10036847. (Year: 1998).*
International Search Report dated Jun. 18, 2013, issued in counterpart Application No. PCT/JP2013/058814 (2 pages).
International Search Report dated Jul. 2, 2013, issued in Patent Application No. PCT/JP2013/058812 (2 pages) counterpart of U.S. Appl. No. 14/353,184.
Notification of Reason for Refusal for JP2013-537993, dated Oct. 22, 2013, counterpart of U.S. Appl. No. 14/353,184.
Non Final Office Action dated Jan. 22, 2016, issued in U.S. Appl. No. 14/353,184(15 pages).
Final Office Action dated Aug. 4, 2016, issued in U.S. Appl. No. 14/353,184(13 pages).
Extended European Search Report dated Oct. 30, 2015, issued in European Patent Application No. 13869858.4 (4 pages) counterpart of U.S. Appl. No. 14/353,445.

(56) References Cited

OTHER PUBLICATIONS

Non Final Office Action dated Dec. 10, 2015, issued in U.S. Appl. No. 14/353,445(10 pages).
Final Office Action dated Apr. 4, 2016, issued in U.S. Appl. No. 14/353,445(10 pages).
Non Final Office Action dated Sep. 29, 2016, issued in U.S. Appl. No. 14/353,445(11 pages).
Consolidated list dated Oct. 15, 2019, issued in counterpart EP Application No. 13879958 (1 page).
Office Action dated Oct. 17, 2019, issued in counterpart EP Application No. 13879958.0 (1 page).
Klasen, Melanie et al., "New Liquid-Crystal Materials for Active Matrix Displays with Negative Dielectric Anisotropy and Low Rotational Viscosity", Jpn. J. Appl. Phys. vol. 39, No. 11B, 2000, pp. L1180-L1182; Cited in EP Office Action dated Oct. 17, 2019.
Yang, Deng-Ke et al, "Fundamentals of Liquid Crystal Devices", John Wiley & Sons, 2006, Chapter 10.3.1, TFT Structure; Cited in EP Opposition dated Dec. 2, 2020. (8 pages).
Howard, W.E., "Thin-film-transistor/ liquid crystal display technology—An introduction", IBM J. Res. Develop., vol. 36 No. 1, Jan. 1992; Cited in EP Opposition dated Dec. 2, 2020. (8 pages).

\* cited by examiner

LIQUID CRYSTAL COMPOSITION AND LIQUID CRYSTAL DISPLAY ELEMENT INCLUDING THE SAME

TECHNICAL FIELD

The present invention relates to a liquid crystal composition suitably used as a component of a liquid crystal display apparatus or the like and a liquid crystal display element.

BACKGROUND ART

Liquid crystal display elements have been used in clocks, electronic calculators, various measurement machines, panels for automobiles, word processors, electronic personal organizers, printers, computers, TVs, clocks, advertisement display boards, and the like. Representative examples of a liquid crystal display method include TN (twisted nematic) type, STN (super twisted nematic) type, and VA (vertical alignment) type and IPS (in-plane switching) type in which TFTs (thin-film transistors) are used. It is desired that a liquid crystal composition used for producing these liquid crystal display elements be stable against external factors such as moisture, air, heat, and light; exhibit a liquid-crystal phase over as wide a temperature range as possible around room temperature; and have a low viscosity and a low drive voltage. The liquid crystal composition is composed of a few to several tens of types of compounds in order to optimize, for example, the dielectric anisotropy ($\Delta\in$) and/or the refractive-index anisotropy ($\Delta n$) of the liquid crystal composition for each individual display element.

The vertical-alignment-type displays, which are widely used in liquid crystal TVs and the like, include a liquid crystal composition having a negative $\Delta\in$. Furthermore, there has been a demand for low-voltage driving, a high-speed response, and a wide operating temperature range regardless of the drive mode. That is, there has been a demand for a positive $\Delta\in$ having a large absolute value, a low viscosity ($\eta$), and a high nematic phase-isotropic liquid phase transition temperature ($T_{ni}$). In addition, on the basis of the configuration of the product of $\Delta n$ and cell gap (d), $\Delta n \times d$, it is necessary to control $\Delta n$ of a liquid crystal composition to be within an appropriate range depending on the cell gap. Moreover, in the case where liquid crystal display elements are used for producing TVs or the like, primary importance is placed on a high-speed response. Thus, there is a demand for a liquid crystal composition having a low $\gamma_1$. Hitherto, compounds having a dialkylbicyclohexane skeleton have been commonly used in order to prepare a liquid crystal composition having a low $\gamma_1$ (see PTL 1). Although the bicyclohexane-based compounds markedly reduce $\gamma_1$, the vapor pressures of the bicyclohexane-based compounds are generally high. This tendency is particularly significant when the compound has a short alkyl chain. In addition, the bicyclohexane-based compounds having a short alkyl chain tend to have a low $T_{ni}$. Accordingly, in many cases, a bicyclohexane-based compound having a total side-chain length of 7 or more carbon atoms is used, and there have been no sufficient studies of a bicyclohexane-based compound having a short side chain.

With the increasing use of liquid crystal display elements, a method for using the liquid crystal display elements and a method for producing the liquid crystal display elements have been greatly changed. In order to address the changes, optimization of properties other than the commonly known fundamental physical properties has become required. Specifically, since a VA (vertical alignment) type and an IPS (in-plane switching) type liquid crystal display elements including a liquid crystal composition have become widely used, extra-large display elements of 50 inches or more have become commercially practical. With the increasing size of the substrate, a common method for injecting a liquid crystal composition into a substrate has shifted from a vacuum injection method, which has been employed in the related art, to an ODF (one-drop fill) method (see PTL 2). This raised a problem of degradation of display quality due to droplet traces formed when the liquid crystal composition is dropped onto the substrate. This problem has been increasingly serious since a PS liquid crystal display element (polymer stabilized) and a PSA liquid crystal display element (polymer sustained alignment) including a liquid crystal material having a pretilt angle have been developed in order to achieve a high-speed response (see PTL 3). Specifically, these display elements are prepared by adding a monomer to a liquid crystal composition and curing the monomer included in the composition. Since a liquid crystal composition for active matrix needs to maintain a high voltage holding ratio, compounds that can be used for producing the liquid crystal composition are specified, and the use of compounds including an ester linkage is limited. Acrylates are mainly used as a monomer for producing PSA liquid crystal display elements, and such a monomer generally includes an ester linkage. In general, such compounds are not used as a liquid crystal compound for active matrix (see PTL 3). The above-described foreign matter may induce the formation of droplet traces, and the resulting faulty display may reduce the yield of the liquid crystal display element. The reduction in yield may also occur when additives such as an antioxidant and a light absorbent are added to a liquid crystal composition.

The term "droplet traces" used herein refers to a phenomenon in which white traces from dropping a liquid crystal composition are revealed during black display.

In order to reduce formation of droplet traces, a method in which a polymer layer is formed in a liquid crystal layer by polymerizing a polymerizable compound mixed in the liquid crystal composition in order to reduce the formation of droplet traces which is caused in relation to an alignment control film is disclosed (PTL 4). However, in this method, the polymerizable compound added to the liquid crystal may cause image sticking of display, and the formation of droplet traces cannot be reduced by a sufficient degree. Thus, the development of a liquid crystal display element that reduces the occurrence of image sticking and droplet traces while maintaining the fundamental properties as a liquid crystal display element has been anticipated.

CITATION LIST

Patent Literature

PTL 1: Japanese Unexamined Patent Application Publication (Translation of PCT Application) No. 2008-505235
PTL 2: Japanese Unexamined Patent Application Publication No. 6-235925
PTL 3: Japanese Unexamined Patent Application Publication No. 2002-357830
PTL 4: Japanese Unexamined Patent Application Publication No. 2006-58755

SUMMARY OF INVENTION

Technical Problem

It is an object of the present invention to provide a liquid crystal composition suitable for producing liquid crystal display elements which reduces the formation of droplet traces during production and allows a liquid crystal material to be ejected at a constant rate during an ODF process without deteriorating the properties of the liquid crystal display element, such as dielectric anisotropy, viscosity, nematic-phase upper-limit temperature, nematic-phase stability at a low temperature, and $\gamma_1$, and the image sticking resistance of the display element. It is another object of the present invention to provide a liquid crystal display element including the liquid crystal composition.

Solution to Problem

In order to address the above problems, the inventors of the present invention have studied various liquid crystal compositions optimal for preparing liquid crystal display elements by a dropping method and found that using specific liquid crystal compounds with specific mixing proportions may reduce the formation of droplet traces in a liquid crystal display element. Thus, the present invention was made.

The present invention provides a liquid crystal composition having a negative dielectric anisotropy, the liquid crystal composition including a compound represented by General Formula (I), a compound represented by General Formula (II), and the compound represented by Formula (IIIb-1). The present invention also provides a liquid crystal display element that includes the liquid crystal composition.

[Chem. 1]

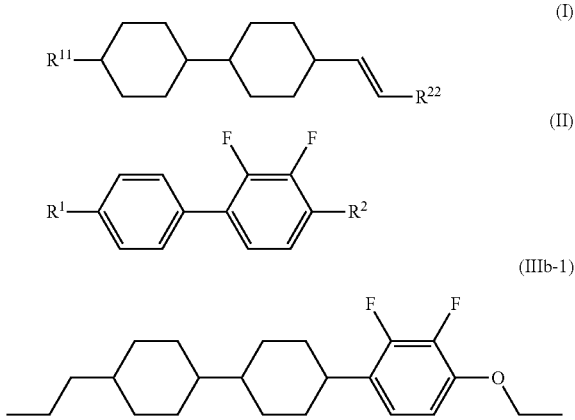

(In General Formulae (I) and (II) and Formula (IIIb-1), $R^{11}$ represents an alkyl group having 1 to 3 carbon atoms; $R^{22}$ represents an alkyl group having 1 to 3 carbon atoms or a hydrogen atom; and $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms)

Advantageous Effects of Invention

The liquid crystal display element according to the present invention achieves a high-speed response, reduces the occurrence of image sticking, and reduces the formation of droplet traces during production. Thus, the liquid crystal display element according to the present invention may be suitably used as a display element for liquid crystal TVs, monitors, and the like.

DESCRIPTION OF EMBODIMENTS

Figure 1:
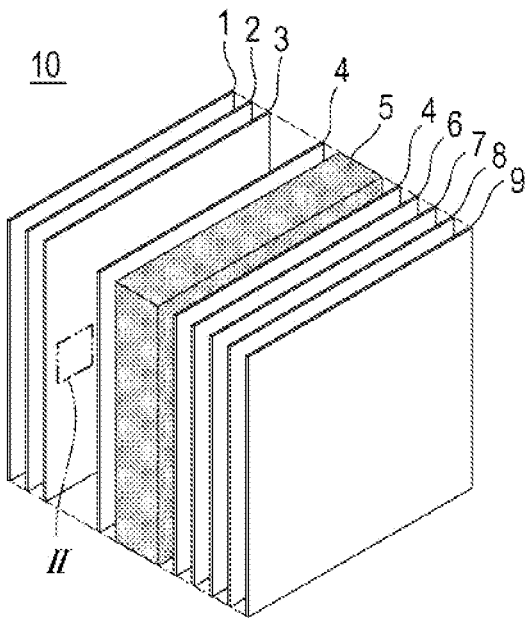
FIG. 1 is a schematic diagram illustrating the structure of a liquid crystal display element.

As described above, the process of the formation of droplet traces has not yet been clarified at the present time. However, there is a high possibility that the interaction between impurities included in a liquid crystal compound and an alignment film, a chromatographic phenomenon, and the like have some influences on the formation of droplet traces. While impurities included in a liquid crystal compound is greatly affected by the process of manufacturing the compound, the process of manufacturing the compound is not always the same even when only the number of carbon atoms included in the side chain is different. In other words, a liquid crystal compound is produced through a precise production process. Therefore, the cost for producing a liquid crystal compound is relatively high among chemical products, and an increase in production efficiency has been strongly anticipated. Thus, in order to use as inexpensive a raw material as possible, there are cases where a liquid crystal compound is produced with a higher efficiency by using a completely different raw material even when only the number of carbon atoms included in the side chain is different. Thus, the process for producing a liquid crystal raw product may differ depending on the raw product. Even when the process is the same, in many cases, the raw material used is different. As a result, in many cases, different impurities are mixed in each raw product. However, droplet traces may be formed due to a trace amount of impurities, and there is a limit to the extent to which formation of droplet traces can be reduced only by purifying the raw product.

On the other hand, after establishing the production process, the common method for producing liquid crystal raw products is likely to be fixed for each raw product. It is not easy to perfectly clarify impurities mixed in a composition even with today's advanced analytical technique. A composition needs to be designed on the understanding that specific impurities unique to each raw product are mixed in the composition. The inventors of the present invention have studied the relationship between the impurities of the liquid crystal raw product and droplet traces and, as a result, empirically clarified that there are two types of impurities, that is, impurities that are less likely to cause droplet traces to be formed when the impurities are included in a composition and impurities that are likely to cause droplet traces to be formed when the impurities are included in a composition. Therefore, in order to reduce the formation of droplet traces, it is important to use specific compounds with specific mixing proportions. The presence of a composition that particularly reduces the formation of droplet traces was clarified. The preferred embodiment of the present invention described below was found form the above-described viewpoints.

In the liquid crystal composition according to the present invention, the lower limit of the total content of compounds represented by General Formula (I) is preferably 2% by mass, is more preferably 3% by mass, and is further preferably 5% by mass, and the upper limit of the total content of compounds represented by General Formula (I) is preferably 25% by mass, is more preferably 20% by mass, and is further preferably 15% by mass. More specifically, when primary importance is placed on the speed of response, the total content of compounds represented by General Formula (I) is preferably 10% to 25% by mass and is more preferably 15% to 25% by mass. When primary importance is placed on drive voltage, the total content of compounds represented by General Formula (I) is preferably 2% to 20% by mass and is more preferably 5% to 15% by mass.

The compound represented by General Formula (I) is preferably selected from the compounds represented by Formulae (I-1) to (I-8) below.

and (I-3), the contents of the selected compounds are preferably each independently 3% to 15% by mass, are more preferably each independently 5% to 10% by mass, and are further preferably each independently 7% to 13% by mass regardless of the number of the selected compounds.

In the liquid crystal composition according to the present invention, the lower limit of the total content of compounds represented by General Formula (II) is preferably 3% by mass, is more preferably 4% by mass, and is further preferably 5% by mass, and the upper limit of the total content of compounds represented by General Formula (II) is preferably 25% by mass, is more preferably 20% by mass, and is further preferably 15% by mass.

The compound represented by General Formula (II) is preferably selected from the compounds represented by Formulae (II-1) to (II-8) below.

[Chem. 2]

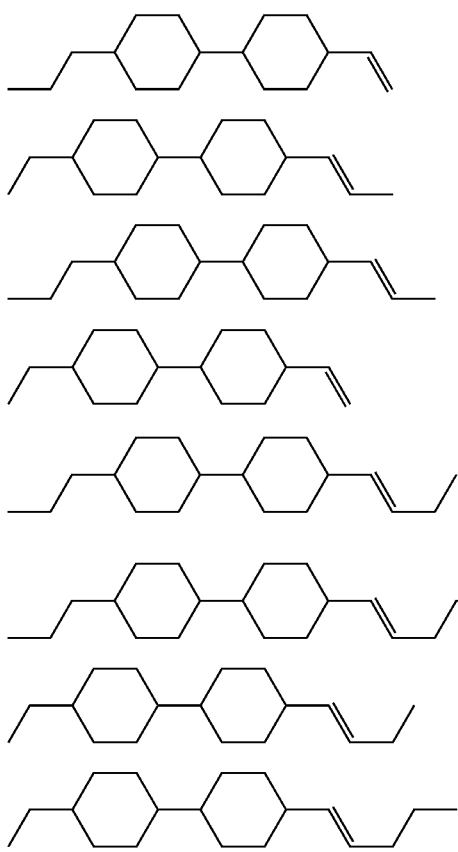

[Chem. 3]

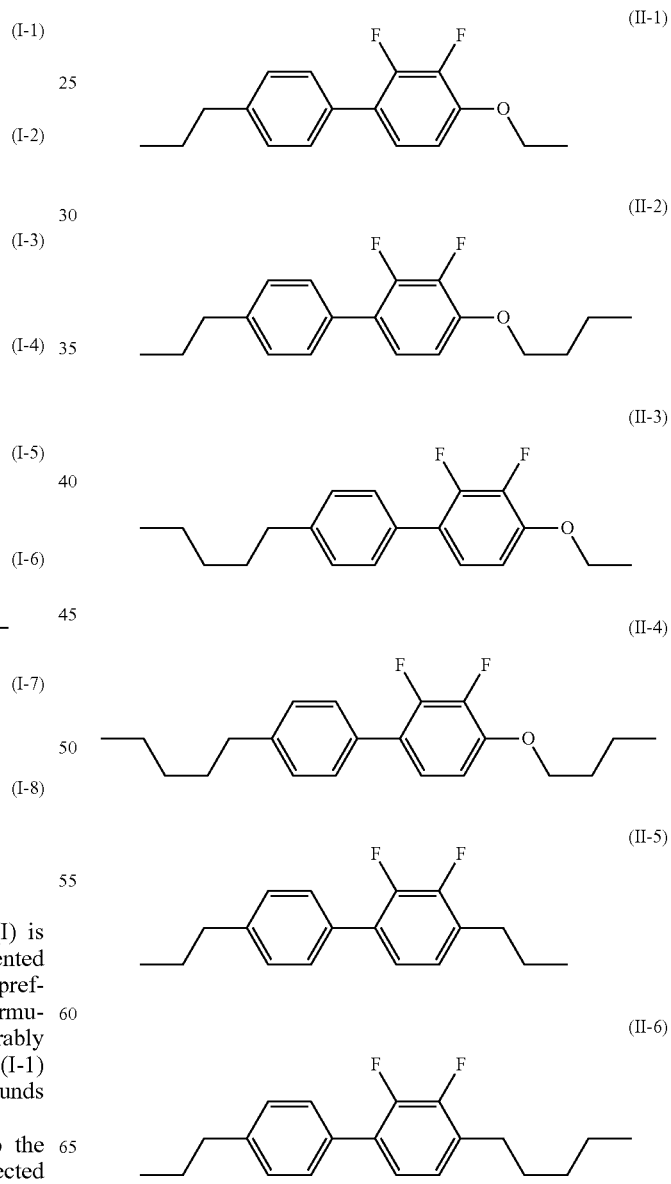

The compound represented by General Formula (I) is more preferably selected from the compounds represented by Formulae (I-1) to (I-4), (I-6), and (I-8), is further preferably selected from the compounds represented by Formulae (I-1) to (II-3), (I-6), and (I-8), is particularly preferably selected from the compounds represented by Formulae (I-1) to (I-3), and is most preferably selected from the compounds represented by Formulae (I-1) and (I-3).

When the liquid crystal composition according to the present invention includes one or more compounds selected from the compounds represented by Formulae (I-1), (I-2), -continued

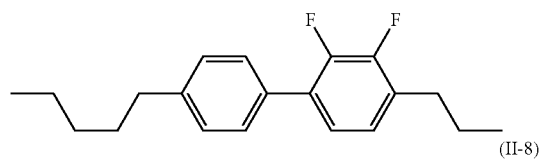
(II-7)

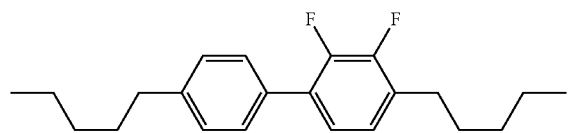
(II-8)

The compound represented by General Formula (II) is more preferably selected from the compounds represented by Formulae (II-1) to (II-4), is further preferably selected from the compounds represented by Formulae (II-1) to (II-3), and is particularly preferably the compound represented by Formula (II-1).

When the liquid crystal composition according to the present invention includes four or more compounds selected from compounds represented by General Formula (II), the compounds represented by Formulae (II-1) to (II-4) are preferably used in combination. The content of the compounds represented by Formulae (II-1) to (II-4) in compounds represented by General Formula (II) is preferably 50% by mass or more, is more preferably 70% by mass or more, is further preferably 80% by mass or more, and is particularly preferably 90% by mass or more.

When the liquid crystal composition according to the present invention includes three compounds selected from compounds represented by General Formula (II), the compounds represented by Formulae (II-1) to (II-3) are preferably used in combination. The content of the compounds represented by Formulae (II-1) to (II-3) in compounds represented by General Formula (II) is preferably 50% by mass or more, is more preferably 70% by mass or more, is further preferably 80% by mass or more, and is particularly preferably 90% by mass or more.

When the liquid crystal composition according to the present invention includes two compounds selected from compounds represented by General Formula (II), the compounds represented by Formulae (II-1) and (II-3) are preferably used in combination. The content of the compounds represented by Formulae (II-1) and (II-3) in compounds represented by General Formula (II) is preferably 50% by mass or more, is more preferably 70% by mass or more, is further preferably 80% by mass or more, and is particularly preferably 90% by mass or more.

In the liquid crystal composition according to the present invention, the lower limit of the content of the compound represented by Formula (IIIb-1) is preferably 5% by mass, is more preferably 8% by mass, and is further preferably 10% by mass, and the upper limit of the content of the compound represented by Formula (IIIb-1) is preferably 25% by mass, is more preferably 20% by mass, and is further preferably 15% by mass. More specifically, in order to reduce the refractive index anisotropy of the liquid crystal composition, the content of the compound represented by Formula (IIIb-1) is preferably 10% to 25% by mass and is more preferably 15% to 25% by mass. In order to increase the refractive index anisotropy of the liquid crystal composition, the content of the compound represented by Formula (IIIb-1) is preferably 5% to 20% by mass and is more preferably 5% to 15% by mass.

The liquid crystal composition according to the present invention may further include a compound selected from compounds represented by General Formula (III) below.

[Chem. 4]

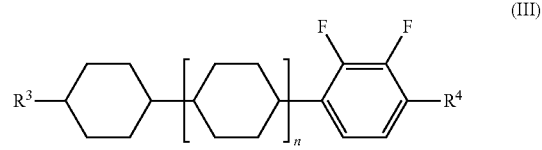
(III)

(In General Formula (III), $R^3$ and $R^4$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; and n is 0 or 1, while a compound with $R^3$ being an alkyl group having 3 carbon atoms, $R^4$ being an alkoxy group having 2 carbon atoms, and n being 1 is not included herein)

In a compound represented by General Formula (III), $R^3$ and $R^4$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms. $R^3$ is preferably an alkyl group having 1 to 8 carbon atoms or an alkenyl group having 2 to 8 carbon atoms, is more preferably an alkyl group having 1 to 8 carbon atoms, and is further preferably an alkyl group having 2 to 5 carbon atoms. $R^4$ is preferably an alkyl group having 1 to 8 carbon atoms or an alkoxy group having 1 to 8 carbon atoms, is more preferably an alkoxy group having 1 to 8 carbon atoms, and is further preferably an alkoxy group having 2 to 5 carbon atoms.

When n is 0, a compound represented by General Formula (III) can be represented by General Formula (IIIa) below.

[Chem. 5]

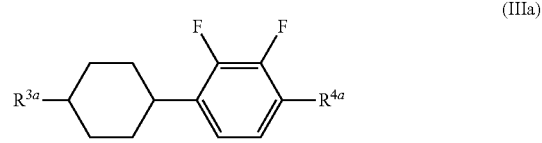
(IIIa)

(In General Formula (IIIa), $R^{3a}$ and $R^{4a}$ represent the same things as $R^3$ and $R^4$ of General Formula (III), respectively)

[Chem. 6]

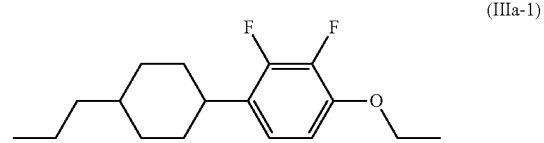
(IIIa-1)

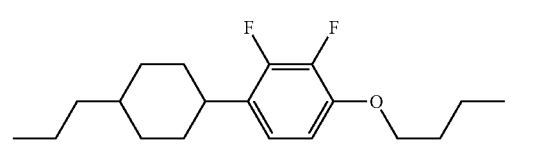
(IIIa-2)

-continued

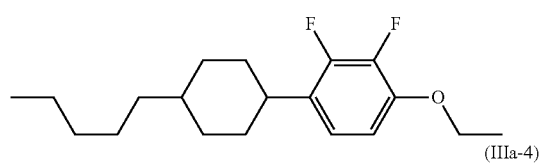
(IIIa-3)

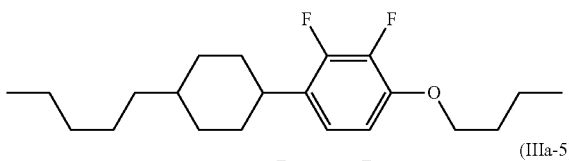
(IIIa-4)

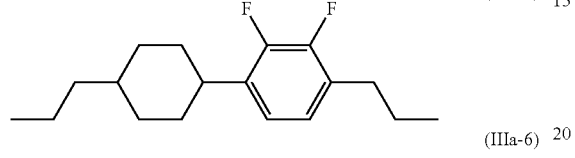
(IIIa-5)

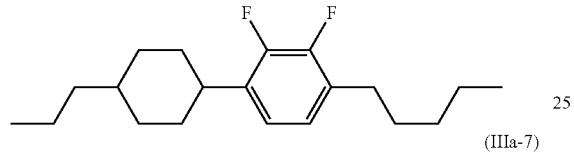
(IIIa-6)

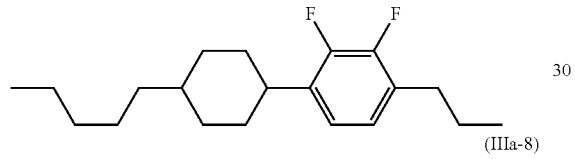
(IIIa-7)

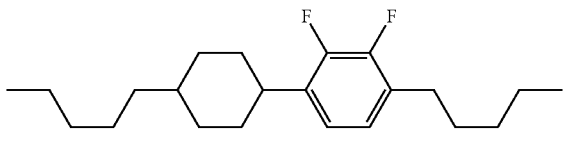
(IIIa-8)

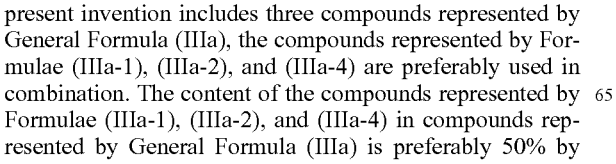

Among compounds represented by General Formula (IIIa), the compounds represented by Formulae (IIIa-1) to (IIIa-8) above are preferably used, the compounds represented by Formulae (IIIa-1) to (IIIa-4) are more preferably used, and the compounds represented by Formulae (IIIa-1) and (IIIa-4) are further preferably used.

The content of compounds represented by General Formula (IIIa) is preferably 3% to 30% by mass, is more preferably 3% to 25% by mass, and is further preferably 3% to 20% by mass.

When the liquid crystal composition according to the present invention includes four or more compounds represented by General Formula (IIIa), the compounds represented by Formulae (IIIa-1) to (IIIa-4) are preferably used in combination. The content of the compounds represented by Formulae (IIIa-1) to (IIIa-4) in compounds represented by General Formula (IIIa) is preferably 50% by mass or more, is more preferably 70% by mass or more, is further preferably 80% by mass or more, and is particularly preferably 90% by mass or more.

When the liquid crystal composition according to the present invention includes three compounds represented by General Formula (IIIa), the compounds represented by Formulae (IIIa-1), (IIIa-2), and (IIIa-4) are preferably used in combination. The content of the compounds represented by Formulae (IIIa-1), (IIIa-2), and (IIIa-4) in compounds represented by General Formula (IIIa) is preferably 50% by mass or more, is more preferably 70% by mass or more, is further preferably 80% by mass or more, and is particularly preferably 90% by mass or more.

When the liquid crystal composition according to the present invention includes two compounds represented by General Formula (IIIa), the compounds represented by Formulae (IIIa-1) and (IIIa-4) are preferably used in combination. The content of the compounds represented by Formulae (IIIa-1) and (IIIa-4) in compounds represented by General Formula (IIIa) is preferably 50% by mass or more, is more preferably 70% by mass or more, is further preferably 80% by mass or more, and is particularly preferably 90% by mass or more.

When n is 1, a compound represented by General Formula (III) can be represented by General Formula (IIIb) below.

[Chem. 7]

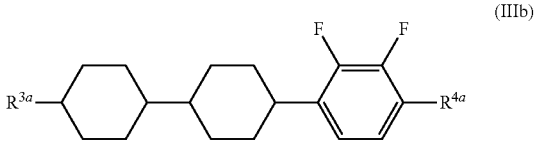
(IIIb)

(In General Formula (IIIb), $R^{3b}$ and $R^{4b}$ represent the same things as $R^3$ and $R^4$ of General Formula (III), respectively, while a compound with $R^{3b}$ being an alkyl group having 3 carbon atoms and $R^{4b}$ being an alkoxy group having 2 carbon atoms is not included herein)

[Chem. 8]

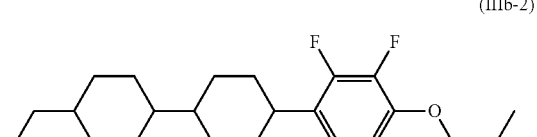
(IIIb-2)

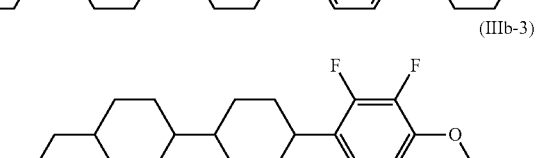
(IIIb-3)

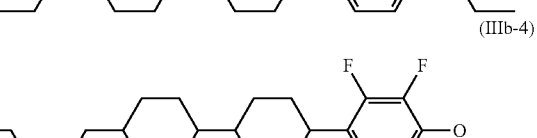
(IIIb-4)

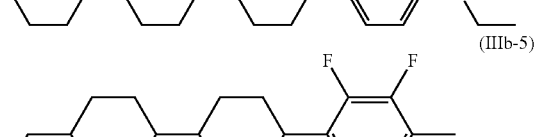
(IIIb-5)

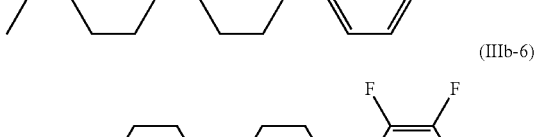
(IIIb-6)

Among compounds represented by General Formula (IIIb), the compounds represented by Formulae (IIIb-2) to (IIIb-6) above are preferably used, the compounds represented by Formulae (IIIb-2) to (IIIb-4) are more preferably used, the compounds represented by Formulae (IIIb-2) and (IIIb-3) are further preferably used, and the compound represented by Formula (IIIb-3) is particularly preferably used. In the case where the liquid crystal composition according to the present invention is required to have a high nematic-isotropic phase transition temperature ($T_{ni}$), at least one compound selected from the compounds represented by Formulae (IIIb-5) and (IIIb-6) is preferably used.

Compounds represented by General Formula (IIIb) have the same liquid crystal skeleton (mesogenic group) as the compound represented by Formula (IIIb-1) which serves as an essential component in the present invention. When the liquid crystal composition according to the present invention includes four or more compounds selected from the compound represented by Formula (IIIb-1) and compounds represented by General Formula (IIIb), the compound represented by Formula (IIIb-1) and the compounds represented by Formulae (IIIb-2) to (IIIb-4) are preferably used in combination. The content of the compounds represented by Formulae (IIIb-2) to (IIIb-4) in compounds represented by General Formula (IIIb) is preferably 50% by mass or more, is more preferably 70% by mass or more, is further preferably 80% by mass or more, and is particularly preferably 90% by mass or less.

When the liquid crystal composition according to the present invention includes three compounds selected from the compound represented by Formula (IIIb-1) and compounds represented by General Formula (IIIb), the compound represented by Formula (IIIb-1) and the compounds represented by Formulae (IIIb-2) and (IIIb-3) are preferably used in combination. The content of the compounds represented by Formulae (IIIb-2) and (IIIb-3) in compounds represented by General Formula (IIIb) is preferably 50% by mass or more, is more preferably 70% by mass or more, and is further preferably 80% by mass or more.

When the liquid crystal composition according to the present invention includes two compounds selected from the compound represented by Formula (IIIb-1) and compounds represented by General Formula (IIIb), the compound represented by Formula (IIIb-1) and the compound represented by Formula (IIIb-3) are preferably used in combination. The content of the compound represented by Formula (IIIb-3) in compounds represented by General Formula (IIIb) is preferably 50% by mass or more, is more preferably 70% by mass or more, is further preferably 80% by mass or more, and is particularly preferably 90% by mass or less.

The liquid crystal composition according to the present invention may further include a compound selected from compounds represented by General Formula (IV) below.

[Chem. 9]

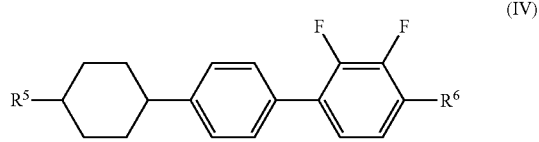

(IV)

(In General Formula (IV), $R^5$ and $R^6$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms)

In the liquid crystal composition according to the present invention, the lower limit of the total content of compounds represented by General Formula (IV) is preferably 5% by mass, is more preferably 10% by mass, and is further preferably 15% by mass, and the upper limit of the total content of compounds represented by General Formula (IV) is preferably 30% by mass, is more preferably 25% by mass, and is further preferably 22% by mass. More specifically, in order to reduce the refractive index anisotropy of the liquid crystal composition, the total content of compounds represented by General Formula (IV) is preferably 5% to 15% by mass. In order to increase the refractive index anisotropy of the liquid crystal composition, the total content of compounds represented by General Formula (IV) is preferably 15% to 30% by mass.

The compound represented by General Formula (IV) is preferably selected from the compounds represented by Formulae (IV-1) to (IV-4) below.

[Chem. 10]

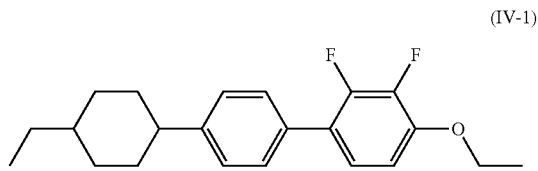

(IV-1)

(IV-2)

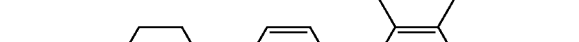

(IV-3)

(IV-4)

The compound represented by General Formula (IV) is more preferably the compound represented by Formulae (IV-1) or (IV-2).

When the liquid crystal composition according to the present invention includes two or more compounds represented by General Formula (IV), the compounds represented by Formulae (IV-1) and (IV-2) are preferably used in combination. The content of the compounds represented by Formulae (IV-1) and (IV-2) in compounds represented by General Formula (IV) is preferably 50% by mass or more, is more preferably 70% by mass or more, is further preferably 80% by mass or more, and is particularly preferably 90% by mass or more.

The liquid crystal composition according to the present invention may further include a compound selected from compounds represented by General Formula (V) below.

[Chem. 11]

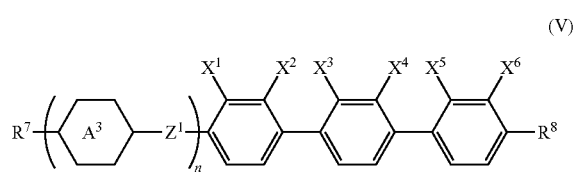
(V)

(In General Formula (V), $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms. One or more hydrogen atoms of the alkyl group, alkenyl group, alkoxy group and/or alkenyloxy group may be replaced by a fluorine atom. A methylene group of the alkyl group, alkenyl group, alkoxy group and/or alkenyloxy group may be replaced by an oxygen atom so that oxygen atoms are not directly bonded to each other or may alternatively be replaced by a carbonyl group so that carbonyl groups are not directly bonded to each other.

$A^3$ represents a 1,4-cyclohexylene group, a 1,4-phenylene group, or a tetrahydropyran-2,5-diyl group. When $A^3$ represents a 1,4-phenylene group, one or more hydrogen atoms of the 1,4-phenylene group may be replaced by a fluorine atom.

$Z^1$ represents a single bond, —OCH$_2$—, —OCF$_2$—, —CH$_2$O—, or —CF$_2$O—.

n represents 0 or 1.

$X^1$ to $X^6$ each independently represent a hydrogen atom or a fluorine atom. At least one of $X^1$ to $X^6$ represents a fluorine atom)

Specifically, the compound represented by General Formula (V) is preferably selected from compounds represented by General Formulae (V-1) to (V-15).

[Chem. 12]

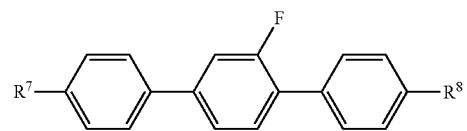
(V-1)

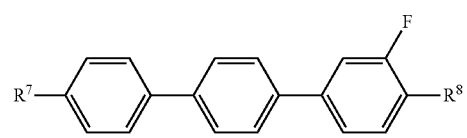
(V-2)

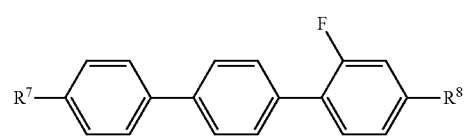
(V-3)

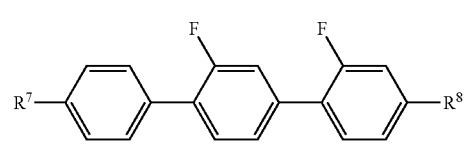
(V-4)

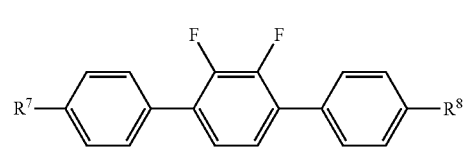
(V-5)

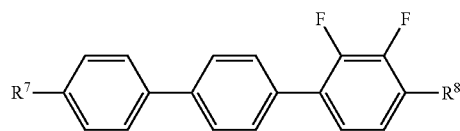
(V-6)

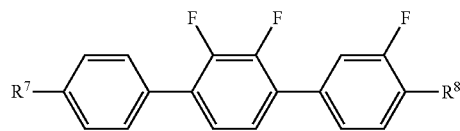
(V-7)

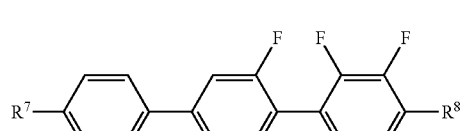
(V-8)

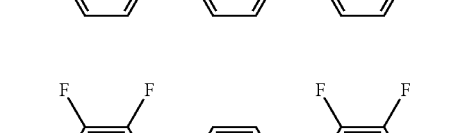
(V-9)

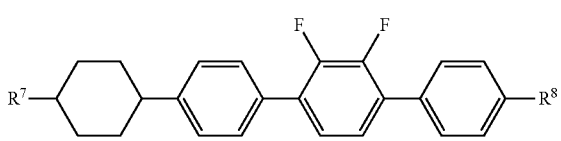
(V-10)

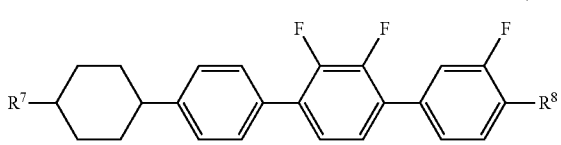
(V-11)

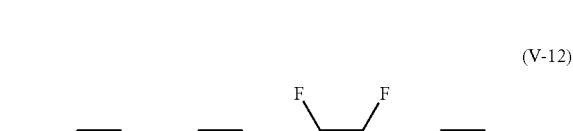
(V-12)

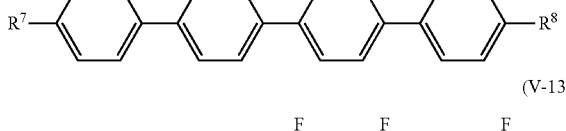
(V-13)

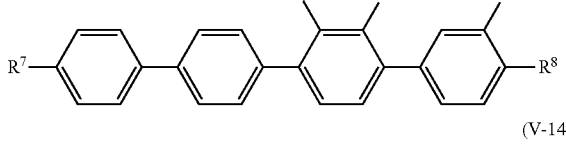
(V-14)

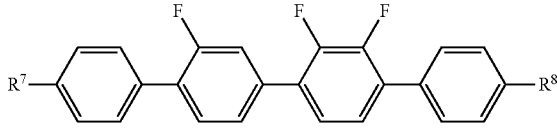
(V-15)

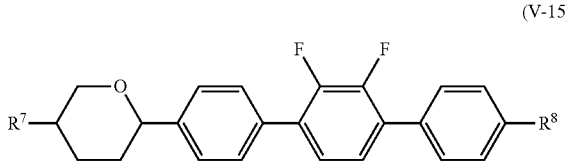

-continued (V-16)

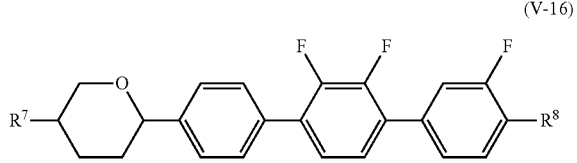

(In General Formulae (V-1) to (V-16), $R^7$ and $R^8$ represent the same things as $R^7$ and $R^8$ of General Formula (V), respectively) The compound represented by General Formula (V) is more preferably selected from compounds represented by Formulae (V-1), (V-3) to (V-9), and (V-12) to (V-15), is further preferably selected from compounds represented by Formulae (V-1), (V-3), (V-5), (V-6), (V-9), (V-12), and (V-15), is particularly preferably selected from compounds represented by Formulae (V-1), (V-5), and (V-6), and is most preferably a compound represented by Formula (V-5).

When the liquid crystal composition according to the present invention includes a compound represented by General Formula (V), a compound represented by Formula (V-5) is preferably used. The content of a compound represented by Formula (V-5) in compounds represented by General Formula (V) is preferably 50% by mass or more, is more preferably 70% by mass or more, is further preferably 80% by mass or more, and is particularly preferably 90% by mass or more.

In General Formula (V), $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms. $R^7$ and $R^8$ preferably each independently represent an alkyl group having 1 to 8 carbon atoms or an alkenyl group having 2 to 8 carbon atoms. $R^7$ and $R^8$ more preferably each independently represent an alkyl group having 2 to 5 carbon atoms or an alkenyl group having 2 to 5 carbon atoms. $R^7$ and $R^8$ further preferably each independently represent an alkyl group having 2 to 5 carbon atoms. $R^7$ and $R^8$ are preferably straight-chain groups. When both $R^7$ and $R^8$ are an alkyl group, the alkyl groups preferably have different carbon numbers.

More specifically, a compound with $R^7$ being a propyl group and $R^8$ being an ethyl group and a compound with $R^7$ being a butyl group and $R^8$ being an ethyl group are preferably used.

The liquid crystal composition according to the present invention may further include a compound selected from compounds represented by General Formulae (VI-a) to (VI-e).

[Chem. 13]

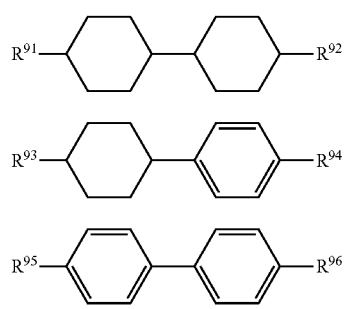

(In General Formulae (VI-a) to (VI-e), $R^{91}$ to $R^{9a}$ each independently represent an alkyl group having 1 to 10 carbon atoms, an alkoxy group having 1 to 10 carbon atoms, or an alkenyl group having 2 to 10 carbon atoms, while a compound represented by General Formula (VI-a) with $R^{91}$ being an alkyl group having 1 to 3 carbon atoms and $R^{92}$ being 1-alkene having 1 to 5 carbon atoms or a hydrogen atom is not included herein)

When the liquid crystal composition according to the present invention includes a compound selected from compounds represented by General Formulae (VI-a) to (VI-e), the number of the selected compounds is preferably 1 to 10, is particularly preferably 1 to 8, and is particularly preferably 1 to 5. It is also preferable that the liquid crystal composition according to the present invention includes two or more compounds or only one compound selected from compounds represented by General Formulae (VI-a) to (VI-e). The content of the selected compounds is preferably 20% to 60% by mass, is more preferably 20% to 50% by mass, is further preferably 25% to 45% by mass, and is particularly preferably 30% to 40% by mass.

$R^{91}$ to $R^{9a}$ preferably each independently represent an alkyl group having 1 to 10 carbon atoms, an alkenyl group having 2 to 10 carbon atoms, or an alkoxy group having 2 to 10 carbon atoms and more preferably each independently represent an alkyl group having 1 to 5 carbon atoms, an alkenyl group having 2 to 5 carbon atoms, or an alkoxy group having 2 to 5 carbon atoms. When $R^{91}$ to $R^{9a}$ represent an alkenyl group, the alkenyl group preferably has a structure selected from the structures represented by Formulae (i) to (iv) below.

[Chem. 14]

(In Formulae (i) to (iv), each structure is bonded to the ring structure at the right end)

When the liquid crystal composition according to the present invention includes a reactive monomer, the structures represented by Formulae (ii) and (iv) are preferably selected, and the structure represented by Formula (ii) is more preferably selected.

$R^{91}$ and $R^{92}$ may be the same as or different from each other, but preferably represent different substituent groups.

Considering the above-described points, more specifically, compounds represented by Formulae (VI-a) to (VI-e) are preferably the following compounds.
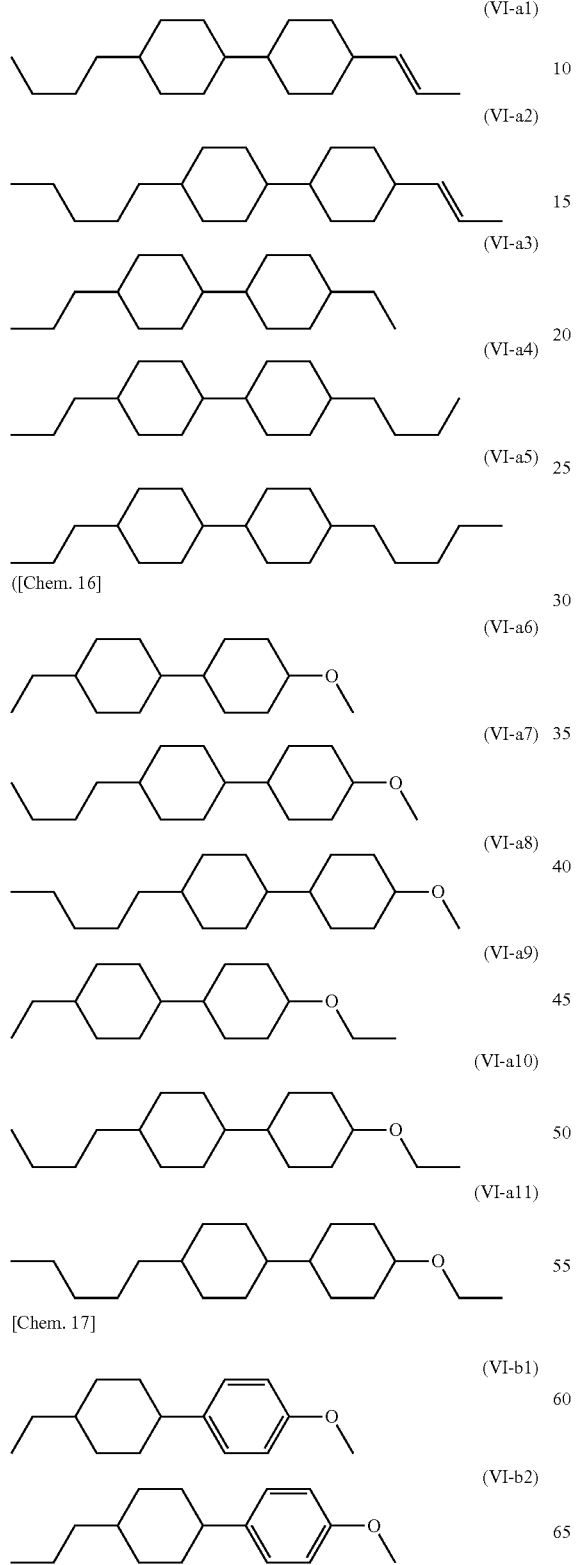

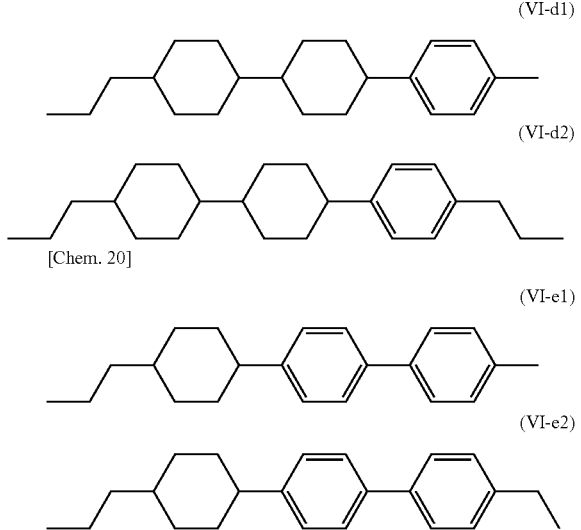

(VI-d1)

(VI-d2)

(VI-e1)

(VI-e2)

Among the above-described compounds, the compounds represented by Formulae (VI-a1) to (VI-a-5), (VI-b2), (VI-b6), (VI-c2), (II-c4), (VI-c5), (VI-d1) to (VI-d4), and (VI-e2) are preferably used.

When the liquid crystal composition according to the present invention includes, as another component, one, two, or three compounds selected from the compounds represented by Formulae (VI-a3) to (VI-a5), the total content of the selected compounds is preferably 15% to 40% by mass, is more preferably 18% to 35% by mass, and is further preferably 20% to 33% by mass. More specifically, when the compound represented by Formula (VI-a3) is selected, the content of the compound represented by Formula (VI-a3) is preferably 5% to 30% by mass, is more preferably 10% to 25% by mass, and is further preferably 13% to 20% by mass. When the compound represented by Formula (VI-a4) is selected, the content of the compound represented by Formula (VI-a4) is preferably 1% to 15% by mass, is more preferably 2% to 12% by mass, and is further preferably 3% to 9% by mass. When the compound represented by Formula (VI-a5) is selected, the content of the compound represented by Formula (VI-a5) is preferably 3% to 15% by mass, is more preferably 5% to 10% by mass, and is further preferably 7% to 9% by mass.

When the liquid crystal composition according to the present invention includes, as another component, two compounds selected from the compounds represented by Formulae (VI-a3) to (VI-a5), the compounds represented by Formulae (VI-a3) and (VI-a4) are preferably selected. When the liquid crystal composition according to the present invention includes, as another component, one compound selected from the compounds represented by Formulae (VI-a3) to (VI-a5), the compound represented by Formula (VI-a3) is more preferably selected.

Compounds represented by General Formula (VI) and compounds represented by General Formula (I) have a dielectric anisotropy of substantially 0 in common. The total content of compounds represented by General Formulae (I) and (VI) is preferably 25% to 60% by mass, is more preferably 30% to 55% by mass, and is further preferably 35% to 50% by mass.

In the present invention, the 1,4-cyclohexyl group is preferably a trans-1,4-cyclohexyl group.

The liquid crystal composition according to the present invention includes a compound represented by General Formula (I), a compound represented by General Formula (II), and the compound represented by Formula (IIIb-1) as essential components. The liquid crystal composition according to the present invention may further include compounds represented by General Formulae (III), (IV), (V), and (VI-a) to (VI-e). The lower limit of the total content of compounds represented by General Formulae (I), (II), (IIIb-1), (III), (IV), (V), and (VI-a) to (VI-e) in the liquid crystal composition is preferably 60% by mass, is preferably 65% by mass, is preferably 70% by mass, is preferably 75% by mass, is preferably 80% by mass, is preferably 85% by mass, is preferably 90% by mass, is preferably 92% by mass, is preferably 95% by mass, is preferably 98% by mass, and is preferably 99% by mass. The upper limit of the total content of compounds represented by General Formulae (I), (II), (IIIb-1), (III), (IV), (V), and (VI-a) to (VI-e) in the liquid crystal composition is preferably 100% by mass and is preferably 99.5% by mass.

More specifically, the total content of compounds represented by General Formulae (I) and (II) and Formula (IIIb-1) is preferably 20% to 45% by mass, is more preferably 25% to 40% by mass, and is further preferably 30% to 37% by mass.

The total content of compounds represented by General Formulae (I) and (II), Formula (IIIb-1), and General Formula (III) is preferably 35% to 55% by mass, is more preferably 40% to 50% by mass, and is further preferably 42% to 48% by mass.

The total content of compounds represented by General Formulae (I) and (II), Formula (IIIb-1), and General Formula (IV) is preferably 40% to 65% by mass, is more preferably 45% to 60% by mass, and is further preferably 47% to 55% by mass.

The total content of compounds represented by General Formulae (I) and (II), Formula (IIIb-1), and General Formula (V) is preferably 25% to 50% by mass, is more preferably 30% to 45% by mass, and is further preferably 35% to 43% by mass.

The total content of compounds represented by General Formulae (I) and (II), Formula (IIIb-1), and General Formula (VI) is preferably 55% to 80% by mass, is more preferably 60% to 75% by mass, and is further preferably 63% to 72% by mass.

The total content of compounds represented by General Formulae (I) and (II), Formula (IIIb-1), General Formula (III), and General Formula (IV) is preferably 50% to 75% by mass, is more preferably 55% to 70% by mass, and is further preferably 58% to 65% by mass.

The total content of compounds represented by General Formulae (I) and (II), Formula (IIIb-1), General Formula (III), and General Formula (V) is preferably 35% to 65% by mass, is more preferably 40% to 60% by mass, and is further preferably 45% to 55% by mass.

The total content of compounds represented by General Formulae (I) and (II), Formula (IIIb-1), General Formula (III), and General Formula (VI) is preferably 65% to 95% by mass, is more preferably 70% to 90% by mass, and is further preferably 75% to 85% by mass.

The total content of compounds represented by General Formulae (I) and (II), Formula (IIIb-1), General Formula (IV), and General Formula (V) is preferably 45% to 70% by mass, is more preferably 50% to 65% by mass, and is further preferably 53% to 60% by mass.

The total content of compounds represented by General Formulae (I) and (II), Formula (IIIb-1), General Formula (IV), and General Formula (VI) is preferably 70% to 99% by mass, is more preferably 75% to 95% by mass, and is further preferably 80% to 90% by mass.

The total content of compounds represented by General Formulae (I) and (II), Formula (IIIb-1), General Formula (V), and General Formula (VI) is preferably 60% to 85% by mass, is more preferably 65% to 80% by mass, and is further preferably 70% to 75% by mass.

The total content of compounds represented by General Formulae (I) and (II), Formula (IIIb-1), General Formula (III), General Formula (IV), and General Formula (V) is preferably 55% to 80% by mass, is more preferably 60% to 75% by mass, and is further preferably 63% to 70% by mass.

The total content of compounds represented by General Formulae (I) and (II), Formula (IIIb-1), General Formula (III), General Formula (IV), and General Formula (VI) is preferably 80% by mass or more, is more preferably 85% by mass or more, and is further preferably 90% by mass or more.

The total content of compounds represented by General Formulae (I) and (II), Formula (IIIb-1), General Formula (III), General Formula (V), and General Formula (VI) is preferably 70% to 95% by mass, is more preferably 75% to 90% by mass, and is further preferably 80% to 85% by mass.

The total content of compounds represented by General Formulae (I) and (II), Formula (IIIb-1), General Formula (IV), General Formula (V), and General Formula (VI) is preferably 80% to 99% by mass, is more preferably 85% to 95% by mass, and is further preferably 87% to 92% by mass.

The total content of compounds represented by General Formulae (I) and (II), Formula (IIIb-1), General Formula (III), General Formula (IV), General Formula (V), and General Formula (VI) is preferably 90% by mass or more, is more preferably 95% by mass or more, is further preferably 97% by mass or more, is preferably substantially 100% by mass, and is preferably 99.5% by mass or more.

In the case where primary importance is placed on the reliability and long-term stability of the liquid crystal composition, the content of a compound having a carbonyl group is preferably set to 5% by mass or less, is more preferably set to 3% by mass or less, and is further preferably set to 1% by mass or less. Most preferably, the liquid crystal composition does not substantially include a compound having a carbonyl group.

In the case where primary importance is placed on the stability to UV irradiation, the content of a compound substituted by a chlorine atom is preferably set to 15% by mass or less, is more preferably set to 10% by mass or less, and is further preferably set to 5% by mass or less relative to the total mass of the composition. Most preferably, the liquid crystal composition does not substantially include a compound substituted by a chlorine atom.

It is preferable to increase the content of a compound in which the ring structures of the molecule are all constituted by six-membered rings. The content of a compound in which the ring structures of the molecule are all constituted by six-membered rings is preferably set to 80% by mass or more, is more preferably set to 90% by mass or more, and is further preferably set to 95% by mass or more relative to the total mass of the composition. Most preferably, the liquid crystal composition is substantially composed of only a compound in which the ring structures of the molecule are all constituted by six-membered rings.

In order to reduce degradation of the liquid crystal composition due to oxidation, it is preferable to reduce the content of a compound having a ring structure that is a cyclohexenylene group. The content of a compound having a cyclohexenylene group is preferably set to 10% by mass or less and is more preferably 5% by mass or less relative to the total mass of the composition. Further preferably, the liquid crystal composition does not substantially include a compound having a cyclohexenylene group.

In the case where primary importance is placed on the improvement of viscosity and Ts, it is preferable to reduce the content of compounds whose molecules include a 2-methylbenzene-1,4-diyl group in which a hydrogen atom may be replaced by a halogen atom. The content of compounds whose molecules include a 2-methylbenzene-1,4-diyl group is preferably set to 10% by mass or less and is more preferably set to 5% by mass or less relative to the total mass of the composition. Further preferably, the liquid crystal composition does not substantially include compounds whose molecules include a 2-methylbenzene-1,4-diyl group.

In the case where a compound included in the composition according to the first embodiment of the present invention includes an alkenyl group that serves as a side chain, the alkenyl group preferably has 2 to 5 carbon atoms when being bonded to cyclohexane and preferably has 4 to 5 carbon atoms when being bonded to benzene. The unsaturated bonding of the alkenyl group is preferably not directly bonded to benzene.

The dielectric anisotropy $\Delta\varepsilon$ of the liquid crystal composition according to the present invention is preferably −2.0 to −6.0, is more preferably −2.5 to −5.0, and is particularly preferably −2.5 to −4.0 at 25° C. More specifically, the dielectric anisotropy $\Delta\varepsilon$ of the liquid crystal composition according to the present invention is preferably −2.5 to −3.4 when primary importance is placed on the speed of response and is preferably −3.4 to −4.0 when primary importance is placed on drive voltage.

The refractive index anisotropy $\Delta n$ of the liquid crystal composition according to the present invention is preferably 0.08 to 0.13 and is more preferably 0.09 to 0.12 at 25° C. More specifically, the refractive index anisotropy $\Delta n$ of the liquid crystal composition according to the present invention is preferably 0.10 to 0.12 when the cell gap is small and is preferably 0.08 to 0.10 when the call gap is large.

The rotational viscosity ($\gamma_1$) of the liquid crystal composition according to the present invention is preferably 150 or less, is more preferably 130 or less, and is particularly preferably 120 or less.

In the liquid crystal composition according to the present invention, a function Z of rotational viscosity and refractive index anisotropy preferably takes a specific value.

$$Z = \gamma 1 / \Delta n^2 \qquad \text{[Math. 1]}$$

(where $\gamma_1$ represents rotational viscosity and $\Delta n$ represents refractive index anisotropy)

Z is preferably 13000 or less, is more preferably 12000 or less, and is particularly preferably 11000 or less.

In the case where the liquid crystal composition according to the present invention is used for producing active matrix display elements, the specific resistance of the liquid crystal composition needs to be $10^{12}$ ($\Omega \cdot m$) or more, is preferably $10^{13}$ ($\Omega \cdot m$), and is more preferably $10^{14}$ ($\Omega \cdot m$) or more.

The liquid crystal composition according to the present invention may further include, in addition to the above-described compounds, an ordinary nematic liquid crystal, a smectic liquid crystal, a cholesteric liquid crystal, an antioxidant, an ultraviolet radiation absorber, a polymerizable monomer, and the like depending on the application. However, in the case where the liquid crystal composition is required to have chemical stability, a chlorine atom is preferably not included in the molecules. In the case where the liquid crystal composition is required to have stability to light such as ultraviolet radiation, it is desirable that a condensed ring or the like having a large conjugation length and an absorption peak in the ultraviolet region, such as a naphthalene ring, be not included in the molecules.

The polymerizable monomer is preferably a bifunctional monomer represented by General Formula (VII).

[Chem. 21]

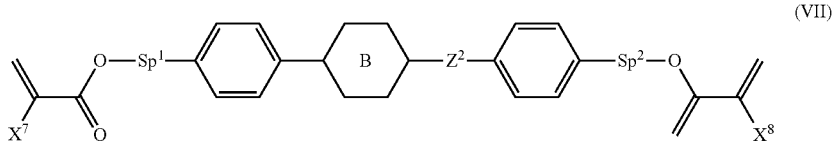

(VII)

(In General Formula (VII), $X^7$ and $X^8$ each independently represent a hydrogen atom or a methyl group, $Sp^1$ and $Sp^2$ each independently represent a single bond, an alkylene group having 1 to 8 carbon atoms, or —O—$(CH_2)_s$— (where s is an integer of 2 to 7 and the oxygen atom is bonded to the aromatic ring), $Z^2$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (where $Y^1$ and $Y^2$ each independently represent a fluorine atom or a hydrogen atom), —C≡C—, or a single bond, and B represents a 1,4-phenylene group, a trans-1,4-cyclohexylene group, or a single bond. In General Formula (VII), any hydrogen atom of the 1,4-phenylene groups may be replaced by a fluorine atom)

The polymerizable monomer represented by General Formula (VII) is preferably a diacrylate derivative in which both $X^7$ and $X^8$ represent a hydrogen atom, a dimethacrylate derivative in which both $X^7$ and $X^8$ represent a methyl group, or a compound in which one of $X^7$ and $X^8$ represents a hydrogen atom and the other represents a methyl group. Among these compounds, the diacrylate derivative has the highest polymerization rate, the dimethacrylate derivative has a low polymerization rate, and the asymmetrical compound has the intermediate polymerization rate. Thus, a mode that is more suitable for the purpose can be selected. In order to produce PSA display elements, the dimethacrylate derivative is particularly preferably used.

$Sp^1$ and $Sp^2$ each independently represent a single bond, an alkylene group having 1 to 8 carbon atoms, or —O—$(CH_2)_s$—. In order to produce PSA display elements, at least one of $Sp^1$ and $Sp^2$ is preferably a single bond. A compound in which both $Sp^1$ and $Sp^2$ represent a single bond and a compound in which one of $Sp^1$ and $Sp^2$ represents a single bond and the other represents an alkylene group having 1 to 8 carbon atoms or —O—$(CH_2)_s$— are also preferably used. In such a case, an alkyl group having 1 to 4 is preferably used, and s is preferably 1 to 4.

Z is preferably —OCH$_2$—, —CH$_2$O—, —COO—, —OCO—, —CF$_2$O—, —OCF$_2$—, —CH$_2$CH$_2$—, —CF$_2$CF$_2$—, or a single bond, is more preferably —COO—, —OCO—, or a single bond, and is particularly preferably a single bond.

B represents a 1,4-phenylene group in which a hydrogen atom may be replaced by a fluorine atom, a trans-1,4-cyclohexylene group, or a single bond and is preferably a 1,4-phenylene group or a single bond. When B does not represent a single bond and represents a ring structure, $Z^2$ is preferably a linking group other than a single bond. When B is a single bond, $Z^1$ is preferably a single bond.

Considering the above-described points, specifically, the ring structure interposed between $Sp^1$ and $Sp^2$ in General Formula (VII) is preferably any one of the following structures.

When, in General Formula (VII), B represents a single bond and the ring structure is constituted by two rings, the ring structure is preferably represented by any one of Formulae (VIIa-1) to (VIIa-5) below.

[Chem. 22]

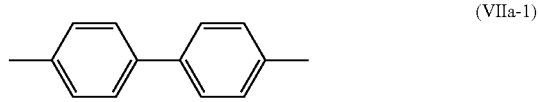

(VIIa-1)

(VIIa-2)

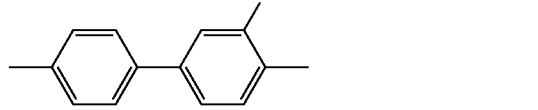

(VIIa-3)

(VIIa-4)

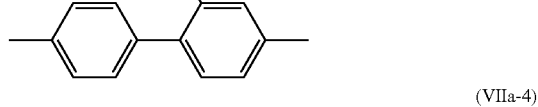

(VIIa-5)

(In Formulae (VIIa-1) to (VIIa-5), both ends of each structure are bonded to $Sp^1$ and $Sp^2$, respectively)

The ring structure is more preferably represented by any one of Formulae (VIIa-1) to (VIIa-3) and is particularly preferably represented by Formula (VIIa-1).

A polymerizable compound having any one of these skeletons optimizes, after being polymerized, an anchoring force for a PSA-mode liquid crystal display element, which improves an alignment state. Therefore, such a polymerizable compound reduces or eliminates the risk of display unevenness.

As described above, the polymerizable monomer is particularly preferably a compound represented by any one of General Formulae (VII-1) to (VII-4) and, in particular, is most preferably the compound represented by General Formula (VII-2).

[Chem. 23]

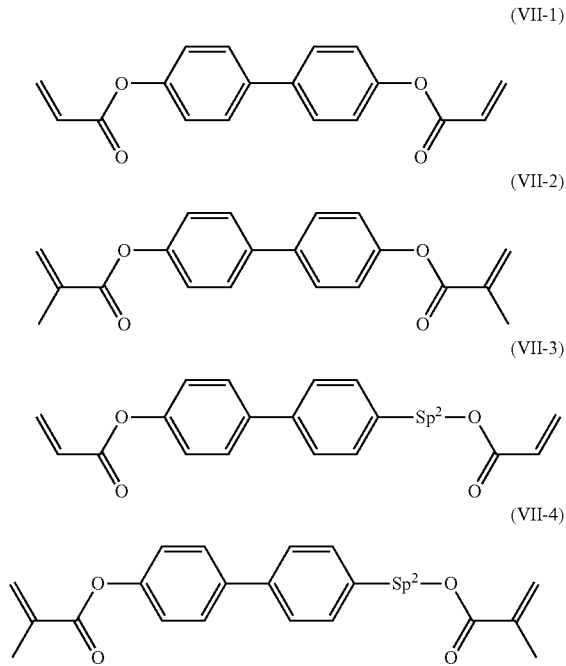

(In General Formulae (VII-1) to (VII-4), Sp represents an alkylene group having 2 to 5 carbon atoms)

When a monomer is added to the liquid crystal composition according to the present invention, polymerization proceeds even in the absence of a polymerization initiator. However, a polymerization initiator may be added to the liquid crystal composition in order to promote polymerization. Examples of the polymerization initiator include benzoin ethers, benzophenones, acetophenones, benzil ketals, and acylphosphine oxides. A stabilizer may also be added to the liquid crystal composition in order to enhance preservation stability. Examples of the stabilizer include hydroquinones, hydroquinone monoalkyl ethers, tertiary butyl catechols, pyrogallols, thiophenols, nitro compounds, β-naphthylamines, β-naphthols, and nitroso compounds.

The polymerizable-compound-containing liquid crystal composition according to the present invention is suitable for producing liquid crystal display elements and, in particular, is suitable for producing active-matrix-driving liquid crystal display elements. The liquid crystal composition may also be used for producing PSA-mode, PSVA-mode, VA-mode, IPS-mode, and ECB-mode liquid crystal display elements.

When the polymerizable-compound-containing liquid crystal composition according to the present invention is irradiated with ultraviolet radiation, polymerization of the polymerizable compound included in the polymerizable-compound-containing liquid crystal composition occurs, which imparts a liquid crystal alignment capability to the polymerizable-compound-containing liquid crystal composition. The polymerizable-compound-containing liquid crystal composition according to the present invention is used for producing a liquid crystal display element, in which the amount of light transmitted is controlled using the birefringence of the liquid crystal composition. The liquid crystal composition according to the present invention is suitable for producing liquid crystal display elements such as an AM-LCD (active matrix liquid crystal display element), a TN (nematic liquid crystal display element), a STN-LCD (super-twisted nematic liquid crystal display element), an OCB-LCD, and an IPS-LCD (in-plane switching liquid crystal display element), is particularly suitable for producing an AM-LCD, and can also be used for producing a transmission-type or reflection-type liquid crystal display element.

Referring to the liquid crystal display element described below and the contents of FIGS. 1 to 4, two substrates 2 and 8 of a liquid crystal cell used in the liquid crystal display element may be composed of glass or a flexible transparent material such as plastic. One of the two substrates 2 and 8 may be composed of a nontransparent material such as silicone. The transparent substrates 2 and 8 including transparent electrodes (layers) 6 and 14, respectively, can be formed by, for example, sputtering indium tin oxide (ITO) on transparent substrates such as glass plates 2 and 8.

The substrates 2 and 8 on which the transparent electrodes (layers) or TFTs are formed are arranged to face each other so that the transparent electrodes (layers) 6 and 14 are located inside. The interval between the substrates may be adjusted by interposing a spacer (not illustrated in the drawing) therebetween (see FIGS. 1 to 4). It is preferable to adjust the interval so that the thickness of the resulting light control layer becomes 1 to 100 µm. The thickness of the light control layer is further preferably 1.5 to 10 µm. In the case where a polarizing plate is used, it is preferable to control the product of the refractive index anisotropy Δn and the cell thickness d of the liquid crystal so that the contrast is maximized. In the case where two polarizing plates 1 and 9 are used, the viewing angle and contrast can be optimized by adjusting the polarizing axis of each polarizing plate (see FIGS. 1 to 4). Furthermore, a phase retardation film may also be used in order to increase viewing angle. Examples of the spacer include glass particles, plastic particles, alumina particles, and a photoresist material. Subsequently, a sealing agent such as an epoxy-based thermosetting composition is screen-printed on the substrate so as to form a liquid-crystal injection port. The substrates are bonded to each other and heated to cause the sealing agent to cure.

The polymerizable-monomer-containing liquid crystal composition can be introduced into a liquid-crystal composition containing space, which is formed by bonding two substrates together so as to face each other as described above and in which the liquid crystal composition is contained, by an ordinary vacuum injection method or an ODF method. In a vacuum injection method, droplet traces are not formed, but a trace of injection remains. In the present invention, an ODF method may be suitable for producing display elements.

In order to polymerize the polymerizable compound, it is preferable to irradiate the polymerization compound with an activation energy beam such as ultraviolet radiation or an electron beam alone, in combination, or in order, because an adequate polymerization rate is desirable in order to impart a good alignment capability to the liquid crystal. When ultraviolet radiation is used, a polarized light source may be used or an unpolarized light source may be used. In the case where polymerization is performed with the polymerizable-compound-containing liquid crystal composition being pinched between two substrates, at least a substrate irradiated with an activation energy beam needs to have a transparency adequate to the activation energy beam. In another case, specific portions may be polymerized using a mask when irradiation is performed, subsequently the alignment state of unpolymerized portions is changed by changing conditions such as electric field, magnetic field, and temperature, and then the unpolymerized portions are irradiated with an activation energy beam to cause polymerization. In particular, when ultraviolet radiation exposure is performed, it is preferable to perform ultraviolet radiation exposure while an alternating electric field is applied to the polymerizable-compound-containing liquid crystal composition. The alternating electric field applied is preferably an alternating electric field at a frequency of 10 Hz to 10 kHz and is more preferably an alternating electric field at a frequency of 60 Hz to 10 kHz. The voltage applied is selected depending on the desired pretilt angle of the liquid crystal display element. In other words, the pretilt angle of the liquid crystal display element can be controlled by the voltage applied. In an MVA-mode liquid crystal display element, the pretilt angle is preferably set to 80° to 89.9° from the viewpoints of alignment stability and contrast.

The temperature at which the irradiation is performed is preferably within a temperature range in which the liquid crystal composition according to the present invention maintains the liquid crystal state. Polymerization is preferably performed at a temperature close to room temperature, that is, typically, 15° C. to 35° C. Examples of a lamp used for generating ultraviolet radiation include a metal halide lamp, a high-pressure mercury lamp, and an extra-high-pressure mercury lamp. The wavelength of the ultraviolet radiation used for irradiation is preferably outside of the region of wavelength absorbed by the liquid crystal composition. The ultraviolet radiation is preferably cut as needed. The intensity of the ultraviolet radiation used for irradiation is preferably 0.1 mW/cm$^2$ to 100 W/cm$^2$ and is more preferably 2 mW/cm$^2$ to 50 W/cm$^2$. The amount of energy of the ultraviolet radiation used for irradiation can be controlled appropriately, is preferably 10 mJ/cm$^2$ to 500 J/cm$^2$, and is more preferably 100 mJ/cm$^2$ to 200 J/cm$^2$. The intensity of the ultraviolet radiation may be changed during the irradiation. The time for which irradiation with ultraviolet radiation is performed may be selected appropriately depending on the intensity of ultraviolet radiation, is preferably 10 to 3600 seconds, and is more preferably 10 to 600 seconds.

Figure 2:
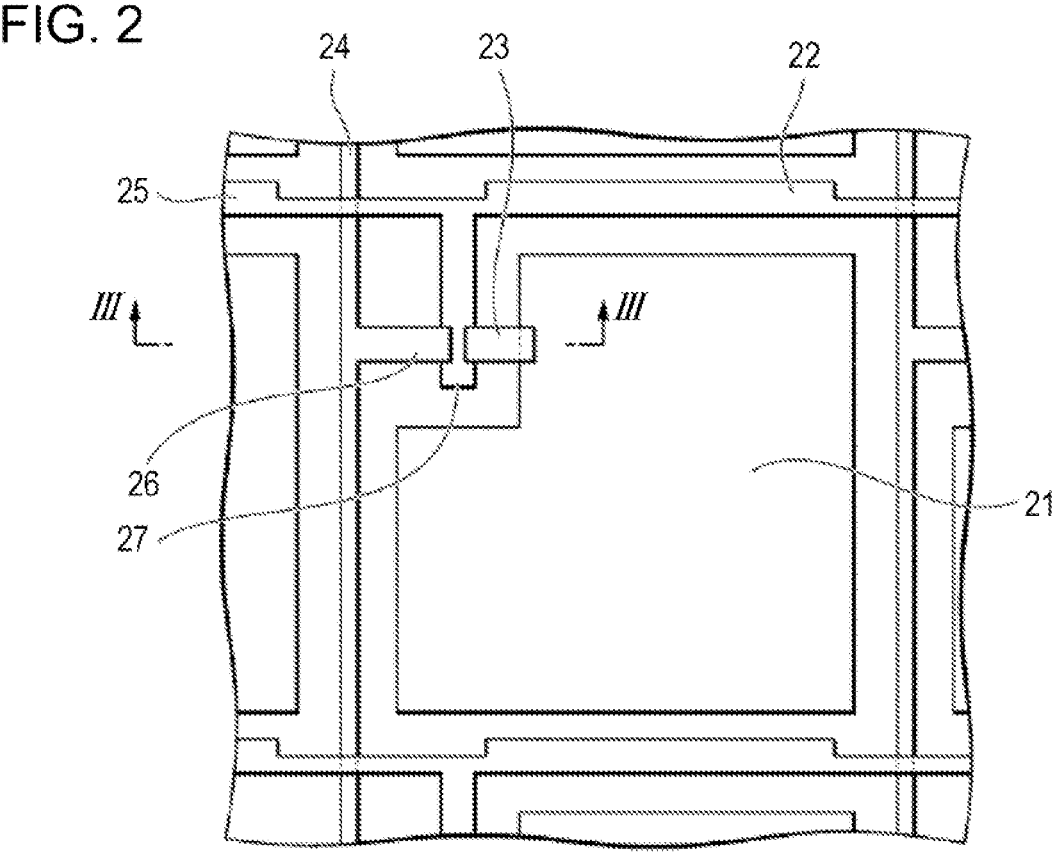
FIG. 2 is an enlarged plan view of a region of an electrode layer 3 that includes a thin-film transistor and is disposed on a substrate illustrated in FIG. 1, which is surrounded by line II.
Figure 3:
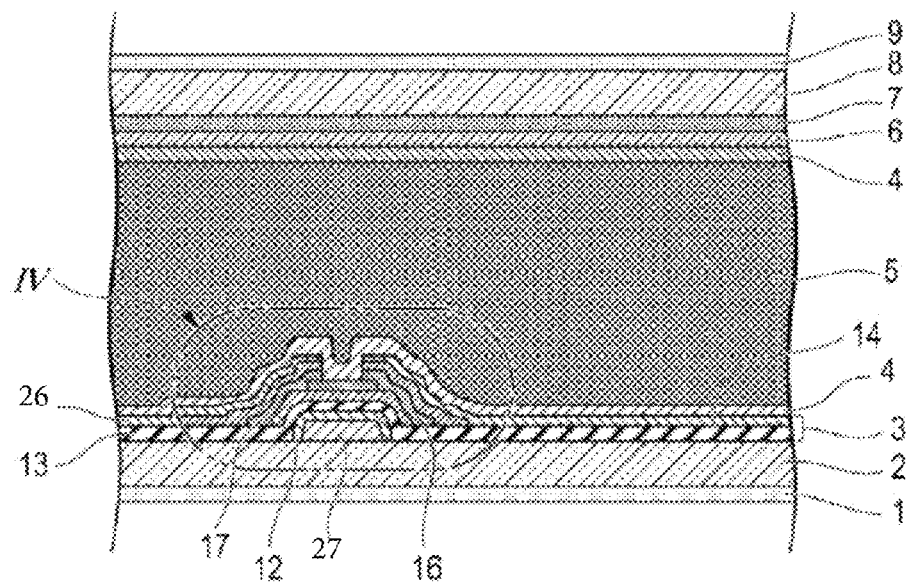
FIG. 3 is a cross-sectional view of the liquid crystal display element illustrated in FIG. 1, which is taken along the line III-III illustrated in FIG. 2.
Figure 4:
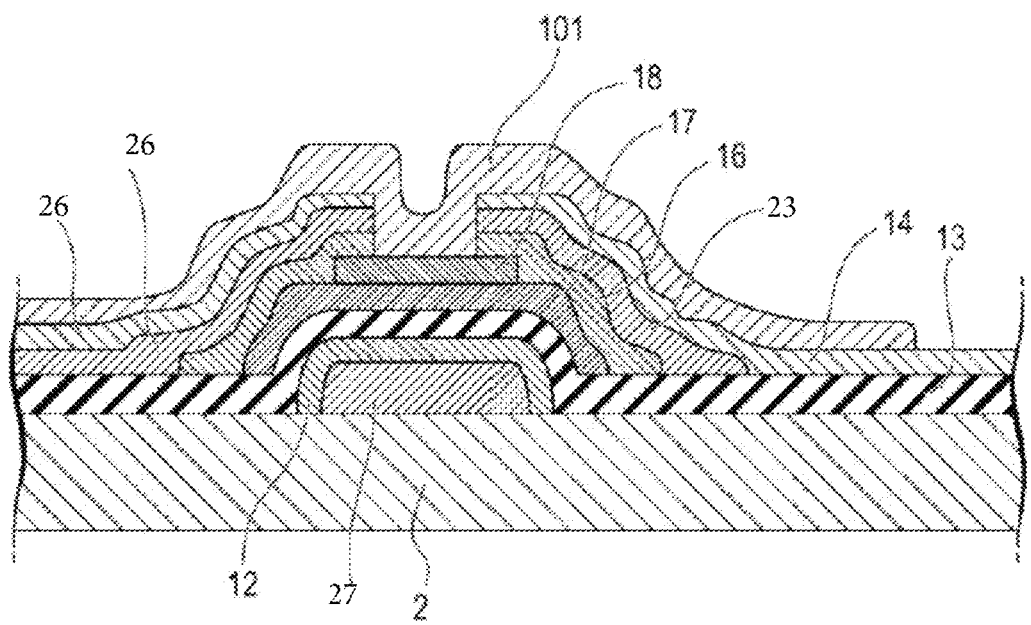
FIG. 4 is an enlarged view of a thin-film transistor located in the region marked with "IV" in FIG. 3.

The second aspect of the present invention provides a liquid crystal display element that includes the liquid crystal composition according to the present invention. FIG. 1 is a diagram schematically illustrating the structure of the liquid crystal display element. In FIG. 1, the components are separated from one another for convenience in explaining. FIG. 2 is an enlarged plan view of a region of an electrode layer 3 (also referred to as "thin-film transistor layer 3") that includes a thin-film transistor and is disposed on a substrate illustrated in FIG. 1, which is surrounded by line II. FIG. 3 is a cross-sectional view of the liquid crystal display element illustrated in FIG. 1, which is taken along the line III-III illustrated in FIG. 2. FIG. 4 is an enlarged view of a thin-film transistor located in the region marked with "IV" in FIG. 3. The liquid crystal display element according to the present invention is described below with reference to FIGS. 1 to 4.

A liquid crystal display element 10 according to the present invention includes a first substrate 8 including a transparent electrode (layer) 6 (also referred to as "common electrode 6") composed of a transparent conductive material, a second substrate 2 including a thin-film transistor layer 3 on which pixel electrodes composed of a transparent conductive material and thin-film transistors that control the respective pixel electrodes disposed on the respective pixels are formed, and a liquid crystal composition (also referred to as "liquid crystal layer 5") pinched between the first substrate 8 and the second substrate 2. The liquid crystal molecules of the liquid crystal composition are aligned in a direction substantially perpendicular to the substrates 2 and 8 when a voltage is not applied to the liquid crystal display element. The liquid crystal composition is the liquid crystal composition according to the present invention. As illustrated in FIGS. 1 and 3, the second substrate 2 and the first substrate 8 may be pinched between a pair of polarizing plates 1 and 9. In FIG. 1, a color filter 7 is interposed between the first substrate 8 and the common electrode 6. A pair of alignment films 4 may be formed on the surfaces of the transparent electrodes (layers) 6 and 14, respectively, so as to be adjacent to the liquid crystal layer 5 according to the present invention and to be brought into direct contact with the liquid crystal composition constituting the liquid crystal layer 5.

That is, the liquid crystal display element 10 according to the present invention includes the second polarizing plate 1, the second substrate 2, the electrode layer (also referred to as "thin-film transistor layer") 3 including a thin-film transistor, the alignment film 4, a layer 5 including a liquid crystal composition, the alignment film 4, the common electrode 6, the color filter 7, the first substrate 8, and the first polarizing plate 9, which are stacked on top of one another in order.

As illustrated in FIG. 2, the electrode layer 3 including thin-film transistors, which is formed on the surface of the second substrate 2, includes gate wires 25 through which a scanning signal is supplied and data wires 24 through which a display signal is supplied. The plurality of gate wires 25 and the plurality of data wires 24 intersect each other, and regions divided by the plurality of gate wires 25 and the plurality of data wires 24 each include a pixel electrode 21 arranged in a matrix. A thin-film transistor including a source electrode 26, a drain electrode 23, and a gate electrode 27 is disposed in the vicinity of a portion at which the gate wire 25 and the data wire 24 intersect each other and connected to the pixel electrode 21. The thin-film transistor serves as a switch element with which a display signal is supplied to the pixel electrode 21. The regions divided by the a plurality of gate wires 25 and the plurality of data wires 24 each further include a storage capacitor 22 in which the display signal supplied through the data wire 24 is stored.

The liquid crystal display element according to the present invention may be suitably used as a liquid crystal display element including an inverted-staggered-type thin-film transistor as illustrated in FIGS. 2 to 4. The gate wires 25, the data wires 24, and the like are preferably metal films and are particularly preferably aluminium wires. The gate wire and the data wire overlap each other with a gate insulation film interposed therebetween.

In order to prevent leakage of light, a black matrix (not illustrated in the drawing) is preferably formed in the color filter 7 so as to correspond the thin-film transistors and the storage capacitors 22.

As illustrated in FIGS. 3 and 4, a thin-film transistor of the liquid crystal display element according to a preferred embodiment of the present invention includes, for example, a gate electrode 27 formed on the surface of the substrate 2, a gate insulation layer 13 formed so as to cover the gate electrode 27 and substantially the entire surface of the substrate 2, a semiconductor layer 17 formed on the surface of the gate insulation layer 13 so as to face the gate electrode 27, a protection film 18 formed so as to cover a portion of the surface of the semiconductor layer 17, a drain electrode 23 formed so as to cover one side edge of the protection layer 18 and one side edge of the semiconductor layer 17 and to be brought into contact with the gate insulation layer 13 formed on the surface of the substrate 2, source electrodes 26 formed so as to cover the other side edge of the protection film 18 and the other side edge of the semiconductor layer 17 and to be brought into contact with the gate insulation layer 13 formed on the surface of the substrate 2, a transparent electrode 14 formed so as to cover the source electrodes 26 and to cover substantially the entire surface of the gate insulation layer 13 similarly to the gate insulation layer 13, and a protection layer 101 (not illustrated in FIG. 3) formed so as to cover a portion of the transparent electrode 14 and the source electrodes 26.

Optionally, an anode oxide film 12 may be formed on the surface of the gate electrode 27 as illustrated in FIGS. 3 and 4 in order to, for example, eliminate a difference in height against the gate electrode. An ohmic contact layer 16 may be interposed between the semiconductor layer 17 and the drain electrode 23 in order to reduce the width and height of the Schottky barrier.

As described above, in the production of liquid crystal display elements, formation of droplet traces is greatly affected by the liquid crystal material injected into the liquid crystal display elements. However, the structure of the liquid crystal display element also affects the formation of droplet traces by a certain degree. In particular, for example, the color filter 7 and the thin-film transistor formed in the liquid crystal display element are separated from the liquid crystal composition only by the thin alignment film 4, the transparent electrodes 6 and 14, and the like as illustrated in FIG. 3. This may cause the formation of droplet traces depending on the combination of, for example, the chemical structure of pigments included in the color filter or the chemical structure of resins included in the color filter and the liquid crystal compound having a specific chemical structure.

In particular, in the case where the thin-film transistor included in the liquid crystal display element according to the present invention is the above-described inverted-staggered-type thin-film transistor, the drain electrode 23 is formed so as to cover the gate electrode 27 as illustrated in FIGS. 2 to 4, which increases the area of the drain electrode 23. Generally, the drain electrode is made of a metal material such as copper, aluminium, chromium, titanium, molybdenum, or tantalum and then subjected to a passivation treatment. However, as illustrated in FIGS. 3 and 4, generally, the protection film 18 and the alignment film 4 have a small thickness and are less likely to block ionic substances. Therefore, it is impossible to prevent formation of droplet traces caused by the interaction between the metal material and the liquid crystal composition.

However, considering, for example, the subtle balance between the members of the liquid crystal display element and the surface free energy, absorption energy, or the like of the liquid crystal composition according to the present invention, it is considered that a liquid crystal display element including the liquid crystal composition according to the present invention is capable of reducing the risk of droplet traces.

A liquid crystal display element including the liquid crystal composition according to the present invention advantageously achieves both a high-speed response and a reduction in the risk of faulty display. The liquid crystal display element is particularly suitable for producing liquid crystal display elements for active matrix driving and may be used in VA mode, PSVA mode, PSA mode, IPS mode, and ECB mode.

EXAMPLES

The present invention is described below further in detail with reference to Examples. However, the present invention is not limited by these Examples. When referring to compositions in Examples and Comparative Examples below, "%" always denotes "% by mass".

The following properties were measured in Examples.

$T_{ni}$: Nematic phase-isotropic liquid phase transition temperature (° C.)

Δn: Refractive index anisotropy at 25° C.

Δ∈: Dielectric anisotropy at 25° C.

η: Viscosity at 20° C. (mPa·s)

$γ_1$: Rotational viscosity at 25° C. (mPa·s)

VHR: Voltage holding ratio at 60° C. measured at a frequency of 60 Hz and an applied voltage of 1 V (%)

Image Sticking:

The image sticking resistance of the liquid crystal display element was evaluated in the following manner. A predetermined fixed pattern was displayed on a display area for 1000 hours. Subsequently, a uniform image was displayed over the entire display area, and the level of the resulting afterimage of the fixed pattern was visually inspected and evaluated on the following four-grade scale.

Excellent: Any afterimage did not occur

Good: A faint afterimage occurred, but at an acceptable level

Fair: An afterimage occurred at an unacceptable level

Poor: A severe afterimage occurred

Droplet Traces:

The resistance to droplet traces of the liquid crystal display apparatus was evaluated by visually inspecting white droplet traces revealed when black display was performed over the entire display and evaluating the results on the following four-grade scale.

Excellent: Any afterimage did not occur

Good: A faint afterimage occurred, but at an acceptable level

Fair: An afterimage occurred at an unacceptable level

Poor: A severe afterimage occurred

Process Compatibility:

Evaluation of process compatibility was made in the following manner. In an ODF process, 50 pL of a liquid crystal was dropped using a constant-volume measuring pump 100000 times. For each 100 drops, that is, "0th to 100th drops, 101st to 200th drops, 201st to 300th drops, . . . 99901st to 100000th drops", a change in the amount of liquid crystal dropped was evaluated on the following four-grade scale.

Excellent: A very small change occurred (capable of producing liquid crystal display elements consistently)

Good: A small change occurred, but at an acceptable level

Fair: A change occurred at an unacceptable level (the yield was reduced due to occurrence of unevenness)

Poor: A severe change occurred (leakage of liquid crystal or vacuum foaming occurred)

Low-Temperature Solubility:

Low-temperature solubility was evaluated in the following manner. After preparation of a liquid crystal composition, 1 g of the liquid crystal composition was weighed and charged in a 2-mL sample bottle. The sample bottle was continuously subjected to a temperature change cycling "−20° C. (holding 1 hour)→heating (0.1° C./minute)→0° C. (holding 1 hour)→heating (0.1° C./minute)→20° C. (holding 1 hour)→cooling (−0.1° C./minute)→0° C. (holding 1 hour)→cooling (−0.1° C./minute)→−20° C." in a thermostat testing tank. Then, precipitation of the liquid crystal composition was visually inspected and evaluated on the following four-grade scale.

Excellent: A precipitate was not observed for 600 hours or more

Good: A precipitate was not observed for 300 hours or more

Fair: A precipitate was observed within 150 hours

Poor: A precipitate was observed within 75 hours

In Examples, the following abbreviations are used to describe compounds.

(Side Chain)

-n —$C_nH_{2n+1}$ Straight-chain alkyl group having n carbon atoms

-On —$OC_nH_{2n+1}$ Straight-chain alkoxy group having n carbon atoms

-V —C=$CH_2$ Vinyl group

-Vn —C=C—$C_nH_{2n+1}$ 1-Alkene having (n+1) carbon atoms (Ring Structure)

[Chem. 24]

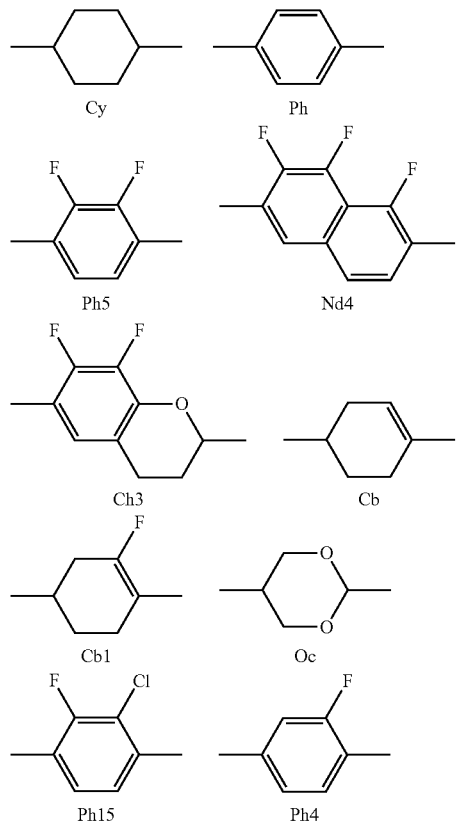

Example 1

A liquid crystal composition (Example 1) including the following components was prepared, and the physical properties of the liquid crystal composition were measured. Table 1 summarizes the results.

A VA liquid crystal display element was prepared using the liquid crystal composition prepared in Example 1. This liquid crystal display element included an inverted-staggered-type thin-film transistor that served as an active element. Injection of the liquid crystal composition was performed by a dropping method. Evaluations of image sticking, droplet traces, process compatibility, and low-temperature solubility were made.

Note that the symbol shown on the left of the content of each compound is the abbreviation of the compound described above.

[Chem. 25]

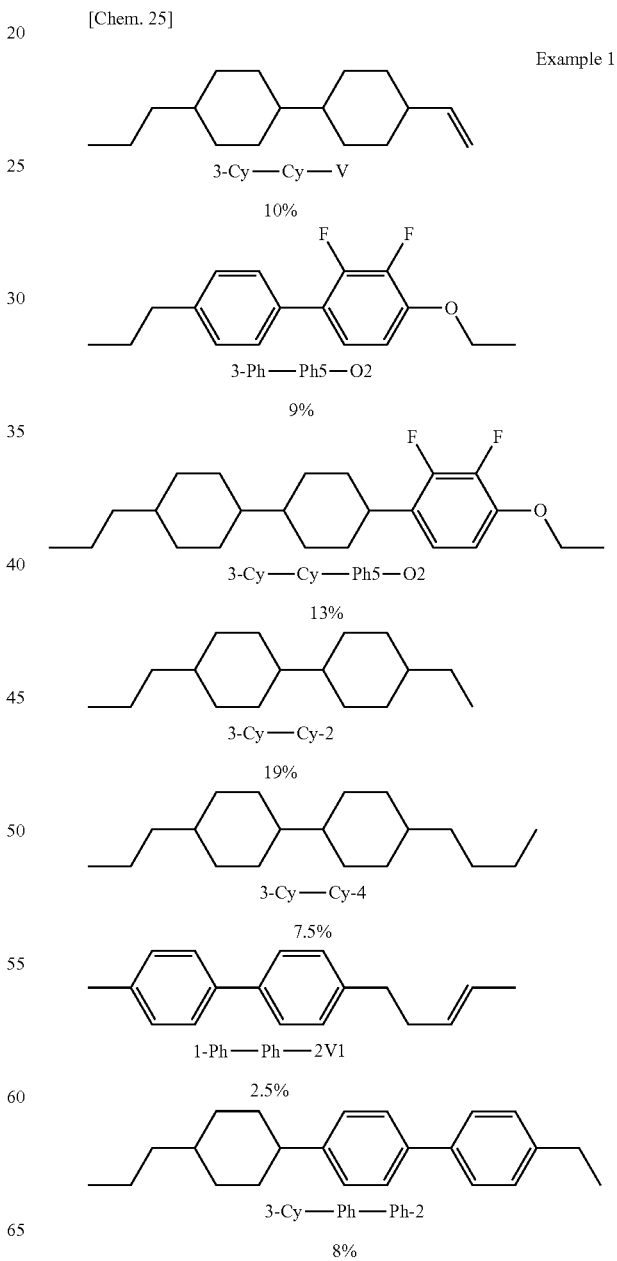

-continued

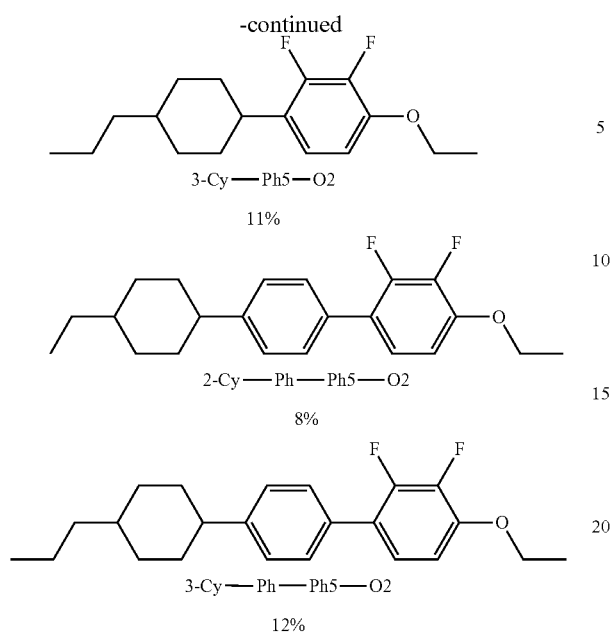

3-Cy—Ph5—O2
11%

2-Cy—Ph—Ph5—O2
8%

3-Cy—Ph—Ph5—O2
12%

TABLE 1

| | |
|---|---|
| $T_{NI}/°\,C.$ | 75.0 |
| $\Delta_n$ | 0.106 |
| $n_o$ | 1.486 |
| $\Delta\varepsilon$ | −3.3 |
| $\varepsilon_\perp$ | 6.7 |
| $\eta/mPa\cdot s$ | 16.3 |
| $\gamma_1/mPa\cdot s$ | 106 |
| $\gamma_1/\Delta_n^2$ | 9.4 |
| Initial voltage holding ratio/% | 99.8 |
| Voltage holding ratio at 150° C. after 1 h/% | 99.4 |
| Image sticking evaluation | Excellent |
| Droplet trace evaluation | Excellent |
| Process compatibility evaluation | Excellent |
| Low-temperature solubility evaluation | Excellent |

The liquid crystal composition prepared in Example 1 had a liquid crystal phase temperature range of 75.0° C., which was practical as a liquid crystal composition for TVs, a dielectric anisotropy having a large absolute value, a low viscosity, and an optimal Δn. The image sticking resistance, resistance to droplet traces, process compatibility, and low-temperature solubility of the VA liquid crystal display element prepared using the liquid crystal composition described in Example 1, which were evaluated by the above-described method, were markedly high.

Comparative Example 1

A liquid crystal composition (Comparative Example 1) not including a compound represented by General Formula (I), which was designed to have a liquid crystal phase temperature range, a refractive index anisotropy, and a dielectric anisotropy that were comparable to those of the composition prepared in Example 1, was prepared. The physical properties of the liquid crystal composition were measured. Table 2 summarizes the results.

As in Example 1, a VA liquid crystal display element was prepared using the liquid crystal composition prepared in Comparative Example 1, and evaluations of image sticking, droplet traces, process compatibility, and low-temperature solubility were made. Table 2 also summarizes the results.

Note that, as in Example 1, the symbol shown on the left of the content of each compound is the abbreviation of the compound described above.

[Chem. 26]

Comparative example 1

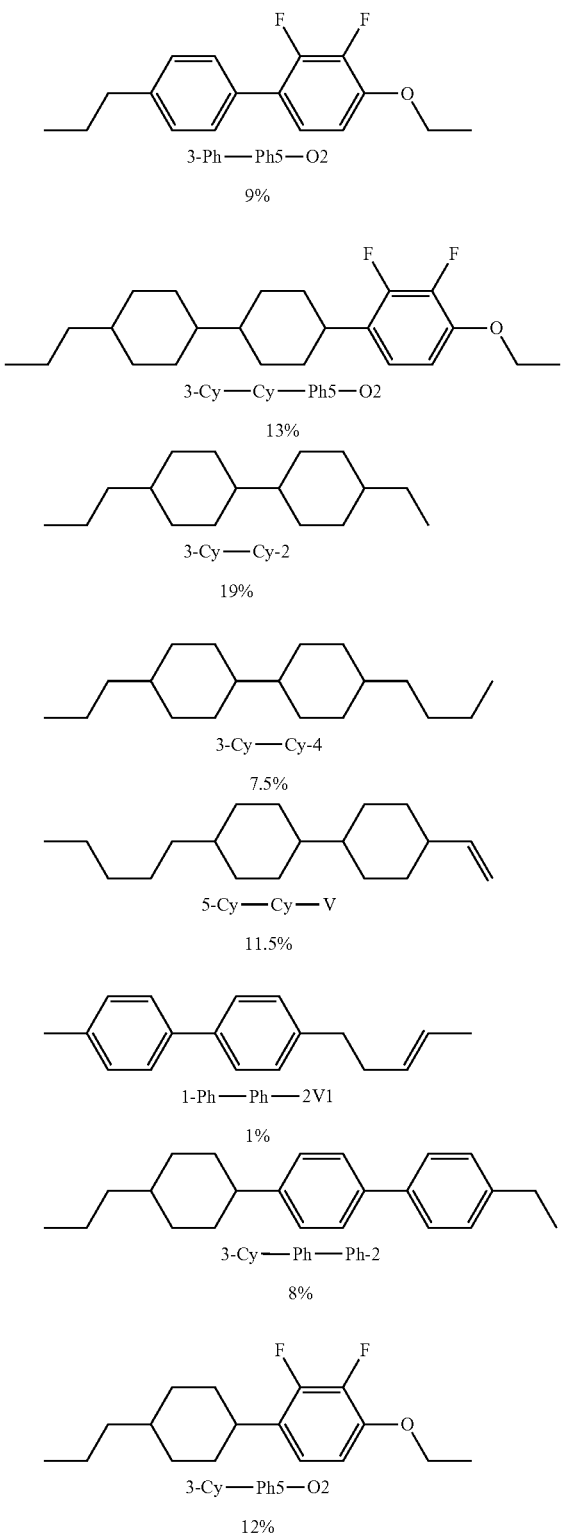

3-Ph—Ph5—O2
9%

3-Cy—Cy—Ph5—O2
13%

3-Cy—Cy-2
19%

3-Cy—Cy-4
7.5%

5-Cy—Cy—V
11.5%

1-Ph—Ph—2V1
1%

3-Cy—Ph—Ph-2
8%

3-Cy—Ph5—O2
12%

-continued

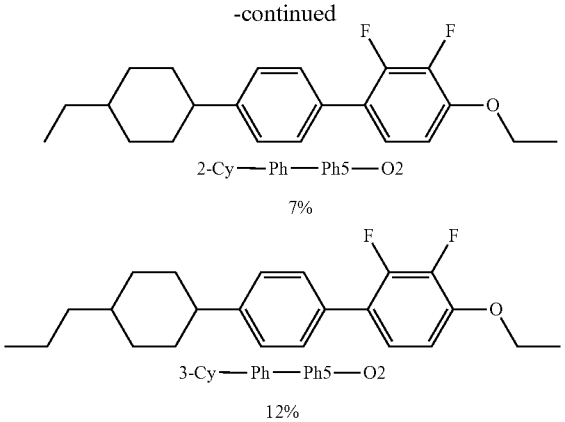

2-Cy—Ph—Ph5—O2

7%

3-Cy—Ph—Ph5—O2

12%

TABLE 2

| | |
|---|---|
| $T_{NI}/°C$ | 76.0 |
| $\Delta_n$ | 0.106 |
| $n_o$ | 1.485 |
| $\Delta\varepsilon$ | −3.3 |
| $\varepsilon_\perp$ | 6.7 |
| $\eta$/mPa · s | 17.8 |
| $\gamma_1$/mPa · s | 118 |
| $\gamma_1/\Delta_n^2$ | 10.5 |
| Initial voltage holding ratio/% | 99.0 |
| Voltage holding ratio at 150° C. after 1 h/% | 98.5 |
| Image sticking evaluation | Poor |
| Droplet trace evaluation | Poor |
| Process compatibility evaluation | Fair |
| Low-temperature solubility evaluation | Fair |

The liquid crystal composition (Comparative Example 1) that did not include a compound represented by General Formula (I) had a liquid crystal phase temperature range, a refractive index anisotropy, and a dielectric anisotropy that were comparable to those of the liquid crystal composition (Example 1) that included 10% by mass of a compound represented by General Formula (I), but had a higher viscosity $\eta$ than the liquid crystal composition prepared in Example 1. The liquid crystal composition prepared in Comparative Example 1 had a $\gamma 1$ of 118 mPa·s, which was higher than that of the liquid crystal composition prepared in Example 1, that is, 106 mPa·s. Comparison of $\gamma 1/\Delta n^2$, which is a parameter of the effective speed of response of a liquid crystal display element or a display, also confirmed that the liquid crystal composition prepared in Comparative Example 1 had a poor property. In Comparative Example 1, the initial VHR was 99.0% and a VHR measured after being left standing at a high temperature, that is, at 150° C. for 1 hour, was 98.5%, which were poorer results than in Example 1. The change occurred in the evaluation of process compatibility was at an unacceptable level compared with Example 1. In the evaluation of low-temperature solubility, precipitation occurred earlier than in Example 1.

Comparative Examples 2 and 3

A liquid crystal composition (Comparative Example 2) not including a compound represented by General Formula (II) and a liquid crystal composition (Comparative Example 3) not including the compound represented by Formula (IIIb-1), which were designed to have a liquid crystal phase temperature range, a refractive index anisotropy, and a dielectric anisotropy that were comparable to those of the composition prepared in Example 1, were prepared. The physical properties of these liquid crystal compositions were measured. Table 3 summarizes the results.

As in Example 1, VA liquid crystal display elements were each prepared using a specific one of the liquid crystal compositions prepared in Comparative Examples 2 and 3, and evaluations of image sticking, droplet traces, process compatibility, and low-temperature solubility were made. Table 3 also summarizes the results.

TABLE 3

| Comparative example 2 | | Comparative example 3 | |
|---|---|---|---|
| 3-Cy-Cy-V | 10.0% | 3-Cy-Cy-V | 10.0% |
| 3-Cy-Cy-Ph5-O2 | 13.0% | 3-Ph-Ph5-O2 | 9.0% |
| 3-Cy-Cy-2 | 16.0% | 3-Cy-Cy-2 | 19.0% |
| 3-Cy-Cy-4 | 4.0% | 3-Cy-Cy-4 | 7.5% |
| 1-Ph-Ph-2V1 | 4.5% | 1-Ph-Ph-2V1 | 3.5% |
| 3-Cy-Ph-Ph-2 | 9.5% | 3-Cy-Ph-Ph-2 | 7.0% |
| 3-Cy-Ph5-O2 | 12.0% | 3-Cy-Ph5-O2 | 11.0% |
| 5-Cy-Ph5-O2 | 11.0% | 4-Cy-Cy-Ph5-O2 | 12.0% |
| 2-Cy-Ph-Ph5-O2 | 8.0% | 2-Cy-Ph-Ph5-O2 | 9.0% |
| 3-Cy-Ph-Ph5-O2 | 12.0% | 3-Cy-Ph-Ph5-O2 | 12.0% |
| $T_{NI}/°C$ | 75.7 | $T_{NI}/°C$ | 75.1 |
| $\Delta_n$ | 0.106 | $\Delta_n$ | 0.106 |
| $n_o$ | 1.485 | $n_o$ | 1.486 |
| $\Delta\varepsilon$ | −3.3 | $\Delta\varepsilon$ | −3.3 |
| $\varepsilon_\perp$ | 6.9 | $\varepsilon_\perp$ | 6.9 |
| $\eta$/mPa · s | 19.0 | $\eta$/mPa · s | 19.0 |
| $\gamma_1$/mPa · s | 121 | $\gamma_1$/mPa · s | 111 |
| $\gamma_1/\Delta_n^2$ | 10.8 | $\gamma_1/\Delta_n^2$ | 9.9 |
| Initial voltage holding ratio/% | 99.1 | Initial voltage holding ratio/% | 98.9 |
| Voltage holding ratio at 150° C. after 1 h/% | 98.3 | Voltage holding ratio at 150° C. after 1 h/% | 97.8 |
| Image sticking evaluation | Fair | Image sticking evaluation | Poor |
| Droplet trace evaluation | Poor | Droplet trace evaluation | Fair |
| Process compatibility evaluation | Fair | Process compatibility evaluation | Fair |
| Low-temperature solubility evaluation | Fair | Low-temperature solubility evaluation | Poor |

The liquid crystal composition (Comparative Example 2) that did not include a compound represented by General Formula (II) had a liquid crystal phase temperature range, a refractive index anisotropy, and a dielectric anisotropy that were comparable to those of the liquid crystal composition (Example 1) that included 9% by mass of a compound represented by General Formula (II), but had a higher viscosity $\eta$ than the liquid crystal composition prepared in Example 1. The liquid crystal composition prepared in Comparative Example 1 had a $\gamma 1$ of 121 mPa·s, which was higher than that of the liquid crystal composition prepared in Example 1, that is, 106 mPa·s. Comparison of $\gamma 1/\Delta n^2$, which is a parameter of the effective speed of response of a liquid crystal display element or a display, also confirmed that the liquid crystal composition prepared in Comparative Example 2 had a poor property. In Comparative Example 2, the initial VHR was 99.1% and a VHR measured after being left standing at a high temperature, that is, at 150° C. for 1 hour, was 98.3%, which were poorer results than in Example 1. The change occurred in the evaluation of process compatibility was at an unacceptable level compared with Example 1. In the evaluation of low-temperature solubility, precipitation occurred earlier than in Example 1.

The liquid crystal composition (Comparative Example 3) that did not include the compound represented by Formula (IIIb-1) had a liquid crystal phase temperature range, a refractive index anisotropy, and a dielectric anisotropy that were comparable to those of the liquid crystal composition (Example 1) that included 13% by mass of the compound represented by Formula (IIIb-1), but had a higher viscosity η than the liquid crystal composition prepared in Example 1. The liquid crystal composition prepared in Comparative Example 1 had a γ1 of 111 mPa·s, which was higher than that of the liquid crystal composition prepared in Example 1, that is, 106 mPa·s. Comparison of $\gamma_1/\Delta n^2$, which is a parameter of the effective speed of response of a liquid crystal display element or a display, also confirmed that the liquid crystal composition prepared in Comparative Example 3 had a poor property, but the difference in $\gamma_1/\Delta n^2$ was not large. However, in Comparative Example 1, the initial VHR was 98.9% and a VHR measured after being left standing at a high temperature, that is, at 150° C. for 1 hour, was 97.8%, which were considerably poorer results than in Example 1. The change occurred in the evaluation of process compatibility was at an unacceptable level compared with Example 1. In the evaluation of low-temperature solubility, precipitation occurred earlier than in Example 1.

Examples 2 and 3

Liquid crystal compositions (Examples 2 and 3) including the following components, which were designed to have a liquid crystal phase temperature range, a refractive index anisotropy, and a dielectric anisotropy that were comparable to those of the composition prepared in Example 1, were prepared. The physical properties of the liquid crystal compositions were measured. Table 4 summarizes the results.

As in Example 1, VA liquid crystal display elements were each prepared using a specific one of the liquid crystal compositions prepared in Examples 2 and 3, and evaluations of image sticking, droplet traces, process compatibility, and low-temperature solubility were made. Table 4 also summarizes the results.

TABLE 4

| Example 2 | | Example 3 | |
|---|---|---|---|
| 2-Cy-Cy-V1 | 10.0% | 3-Cy-Cy-V1 | 12.0% |
| 3-Ph-Ph5-O2 | 9.5% | 3-Ph-Ph5-O2 | 10.0% |
| 3-Cy-Cy-Ph5-O2 | 13.0% | 3-Cy-Cy-Ph5-O2 | 12.5% |
| 3-Cy-Cy-2 | 19.0% | 3-Cy-Cy-2 | 19.0% |
| 3-Cy-Cy-4 | 8.0% | 3-Cy-Cy-4 | 7.5% |
| 1-Ph-Ph-2V1 | 2.0% | 1-Ph-Ph-2V1 | 3.0% |
| 3-Cy-Ph-Ph-2 | 8.5% | 3-Cy-Ph-Ph-2 | 7.0% |
| 3-Cy-Ph5-O2 | 10.5% | 3-Cy-Ph5-O2 | 11.0% |
| 2-Cy-Ph-Ph5-O2 | 7.5% | 2-Cy-Ph-Ph5-O2 | 6.0% |
| 3-Cy-Ph-Ph5-O2 | 12.0% | 3-Cy-Ph-Ph5-O2 | 12.0% |
| $T_{NI}/°$ C. | 75.6 | $T_{NI}/°$ C. | 75.0 |
| $\Delta_n$ | 0.106 | $\Delta_n$ | 0.106 |
| $n_o$ | 1.486 | $n_o$ | 1.485 |
| Δε | −3.3 | Δε | −3.3 |
| $\varepsilon_\perp$ | 6.7 | $\varepsilon_\perp$ | 6.6 |
| η/mPa·s | 16.3 | η/mPa·s | 16.0 |
| $\gamma_1$/mPa·s | 106 | $\gamma_1$/mPa·s | 107 |
| $\gamma_1/\Delta_n^2$ | 9.4 | $\gamma_1/\Delta_n^2$ | 9.5 |
| Initial voltage holding ratio/% | 99.7 | Initial voltage holding ratio/% | 99.9 |
| Voltage holding ratio at 150° C. after 1 h/% | 99.5 | Voltage holding ratio at 150° C. after 1 h/% | 99.6 |
| Image sticking evaluation | Excellent | Image sticking evaluation | Good |
| Droplet trace evaluation | Excellent | Droplet trace evaluation | Excellent |
| Process compatibility evaluation | Excellent | Process compatibility evaluation | Excellent |
| Low-temperature solubility evaluation | Good | Low-temperature solubility evaluation | Good |

The liquid crystal composition prepared in Example 2 had a liquid crystal phase temperature range practical as a liquid crystal composition for TVs, a dielectric anisotropy having a large absolute value, a low viscosity, and an optimal Δn. The Image sticking resistance, resistance to droplet traces, process compatibility, and low-temperature solubility of the VA liquid crystal display element prepared using the liquid crystal composition described in Example 2, which were evaluated by the above-described method, were markedly high.

The liquid crystal composition prepared in Example 3 had a liquid crystal phase temperature range practical as a liquid crystal composition for TVs, a dielectric anisotropy having a large absolute value, a low viscosity, and an optimal Δn. The Image sticking resistance, resistance to droplet traces, process compatibility, and low-temperature solubility of the VA liquid crystal display element prepared using the liquid crystal composition described in Example 3, which were evaluated by the above-described method, were markedly high.

Examples 4 and 5

Liquid crystal compositions (Examples 4 and 5) including the following components, which were designed to have a liquid crystal phase temperature range, a refractive index anisotropy, and a dielectric anisotropy that were comparable to those of the composition prepared in Example 1, were prepared. The physical properties of the liquid crystal compositions were measured. Table 5 summarizes the results.

As in Example 1, VA liquid crystal display elements were each prepared using a specific one of the liquid crystal compositions prepared in Examples 4 and 5, and evaluations of image sticking, droplet traces, process compatibility, and low-temperature solubility were made.

Table 5 also summarizes the results.

TABLE 5

| Example 4 | | Example 5 | |
|---|---|---|---|
| 3-Cy-Cy-V | 10.0% | 2-Cy-Cy-V1 | 10.0% |
| 3-Ph-Ph5-O2 | 10.0% | 3-Ph-Ph5-O2 | 10.0% |
| 3-Cy-Cy-Ph5-O2 | 13.0% | 3-Cy-Cy-Ph5-O2 | 13.0% |
| 3-Cy-Cy-2 | 15.0% | 3-Cy-Cy-2 | 15.0% |
| 3-Cy-Cy-4 | 5.0% | 3-Cy-Cy-4 | 5.0% |
| 3-Cy-Cy-5 | 7.0% | 3-Cy-Cy-5 | 8.0% |
| 1-Ph-Ph-2V1 | 2.5% | 1-Ph-Ph-2V1 | 2.0% |
| 3-Cy-Ph-Ph-2 | 7.5% | 3-Cy-Ph-Ph-2 | 7.0% |
| 3-Cy-Ph5-O2 | 11.0% | 3-Cy-Ph5-O2 | 11.0% |
| 2-Cy-Ph-Ph5-O2 | 7.0% | 2-Cy-Ph-Ph5-O2 | 7.0% |
| 3-Cy-Ph-Ph5-O2 | 12.0% | 3-Cy-Ph-Ph5-O2 | 12.0% |
| $T_{NI}/°$ C. | 75.5 | $T_{NI}/°$ C. | 75.7 |
| $\Delta_n$ | 0.106 | $\Delta_n$ | 0.106 |
| $n_o$ | 1.486 | $n_o$ | 1.485 |
| Δε | −3.3 | Δε | −3.3 |
| $\varepsilon_\perp$ | 6.7 | $\varepsilon_\perp$ | 6.7 |
| η/mPa·s | 16.9 | η/mPa·s | 17.0 |
| $\gamma_1$/mPa·s | 109 | $\gamma_1$/mPa·s | 109 |
| $\gamma_1/\Delta_n^2$ | 9.7 | $\gamma_1/\Delta_n^2$ | 9.7 |
| Initial voltage holding ratio/% | 99.9 | Initial voltage holding ratio/% | 99.8 |

TABLE 5-continued

| | Example 4 | | Example 5 | |
|---|---|---|---|---|
| Voltage holding ratio at 150° C. after 1 h/% | 99.3 | Voltage holding ratio at 150° C. after 1 h/% | 99.2 | |
| Image sticking evaluation | Excellent | Image sticking evaluation | Good | |
| Droplet trace evaluation | Good | Droplet trace evaluation | Excellent | |
| Process compatibility evaluation | Excellent | Process compatibility evaluation | Excellent | |
| Low-temperature solubility evaluation | Excellent | Low-temperature solubility evaluation | Good | |

The liquid crystal composition prepared in Example 4 had a liquid crystal phase temperature range practical as a liquid crystal composition for TVs, a dielectric anisotropy having a large absolute value, a low viscosity, and an optimal Δn. The image sticking resistance, resistance to droplet traces, process compatibility, and low-temperature solubility of the VA liquid crystal display element prepared using the liquid crystal composition described in Example 4, which were evaluated by the above-described method, were markedly high.

The liquid crystal composition prepared in Example 5 had a liquid crystal phase temperature range practical as a liquid crystal composition for TVs, a dielectric anisotropy having a large absolute value, a low viscosity, and an optimal Δn. The image sticking resistance, resistance to droplet traces, process compatibility, and low-temperature solubility of the VA liquid crystal display element prepared using the liquid crystal composition described in Example 5, which were evaluated by the above-described method, were markedly high.

Example 6

A liquid crystal composition (Example 6) including the following components, which was designed to have a liquid crystal phase temperature range, a refractive index anisotropy, and a dielectric anisotropy that were comparable to those of the composition prepared in Example 1, was prepared. The physical properties of the liquid crystal composition were measured. Table 6 summarizes the results.

As in Example 1, a VA liquid crystal display element was prepared using the liquid crystal composition prepared in Example 6, and evaluations of image sticking, droplet traces, process compatibility, and low-temperature solubility were made. Table 6 also summarizes the results.

TABLE 6

| Example 6 | |
|---|---|
| 3-Cy-Cy-V1 | 10.0% |
| 3-Ph-Ph5-O2 | 11.0% |
| 3-Cy-Cy-Ph5-O2 | 13.0% |
| 3-Cy-Cy-2 | 15.0% |
| 3-Cy-Cy-4 | 6.0% |
| 3-Cy-Cy-5 | 8.0% |
| 1-Ph-Ph-2V1 | 3.5% |
| 3-Cy-Ph-Ph-2 | 5.0% |
| 3-Cy-Ph5-O2 | 10.5% |
| 2-Cy-Ph-Ph5-O2 | 6.0% |
| 3-Cy-Ph-Ph5-O2 | 12.0% |
| $T_{NI}/°$ C. | 75.1 |
| $\Delta_n$ | 0.106 |
| $n_o$ | 1.484 |

TABLE 6-continued

| Example 6 | |
|---|---|
| Δε | −3.3 |
| $\varepsilon_\perp$ | 6.7 |
| η/mPa · s | 17.1 |
| $\gamma_1$/mPa · s | 113 |
| $\gamma_1/\Delta_n^2$ | 10.1 |
| Initial voltage holding ratio/% | 99.8 |
| Voltage holding ratio at 150° C. after 1 h/% | 99.4 |
| Image sticking evaluation | Good |
| Droplet trace evaluation | Good |
| Process compatibility evaluation | Excellent |
| Low-temperature solubility evaluation | Good |

The liquid crystal composition prepared in Example 6 had a liquid crystal phase temperature range practical as a liquid crystal composition for TVs, a dielectric anisotropy having a large absolute value, a low viscosity, and an optimal Δn. The image sticking resistance, resistance to droplet traces, process compatibility, and low-temperature solubility of the VA liquid crystal display element prepared using the liquid crystal composition described in Example 6, which were evaluated by the above-described method, were markedly high.

Example 7

A liquid crystal composition (Example 7) including the following components, which was designed to have a liquid crystal phase temperature range and a dielectric anisotropy that were comparable to those of the composition prepared in Example 1 and a higher refractive index, that is, a smaller gap of the liquid crystal display in order to achieve a high-speed response, than the composition prepared in Example 1 was prepared. The physical properties of the liquid crystal composition were measured. Table 7 summarizes the results.

As in Example 1, a VA liquid crystal display element was prepared using the liquid crystal composition prepared in Example 7, and evaluations of image sticking, droplet traces, process compatibility, and low-temperature solubility were made. Table 7 also summarizes the results.

TABLE 7

| Example 7 | |
|---|---|
| 3-Cy-Cy-V | 10.0% |
| 3-Ph-Ph5-O2 | 9.5% |
| 3-Cy-Cy-Ph5-O2 | 13.0% |
| 3-Cy-Cy-2 | 18.0% |
| 3-Cy-Cy-4 | 7.0% |
| 1-Ph-Ph-2V1 | 1.5% |
| 3-Cy-Ph-Ph-2 | 8.0% |
| 3-Cy-Ph5-O2 | 11.0% |
| 2-Cy-Ph-Ph5-O2 | 6.0% |
| 3-Cy-Ph-Ph5-O2 | 11.0% |
| 3-Ph-Ph5-Ph-2 | 5.0% |
| $T_{NI}/°$ C. | 75.5 |
| $\Delta_n$ | 0.112 |
| $n_o$ | 1.487 |
| Δε | −3.3 |
| $\varepsilon_\perp$ | 6.7 |
| η/mPa · s | 16.7 |
| $\gamma_1$/mPa · s | 112 |
| $\gamma_1/\Delta_n^2$ | 8.9 |
| Initial voltage holding ratio/% | 99.8 |
| Voltage holding ratio at 150° C. after 1 h/% | 99.3 |
| Image sticking evaluation | Excellent |
| Droplet trace evaluation | Excellent |
| Process compatibility evaluation | Excellent |
| Low-temperature solubility evaluation | Excellent |

The liquid crystal composition prepared in Example 7 had a liquid crystal phase temperature range practical as a liquid crystal composition for TVs, a dielectric anisotropy having a large absolute value, a low viscosity, and an optimal Δn. The image sticking resistance, resistance to droplet traces, process compatibility, and low-temperature solubility of the VA liquid crystal display element prepared using the liquid crystal composition described in Example 7, which were evaluated by the above-described method, were markedly high.

Comparative Example 1

A liquid crystal composition (Comparative Example 4) not including a compound represented by General Formula (I) and a liquid crystal composition (Comparative Example 5) not including a compound represented by General Formula (II), which were designed to have a liquid crystal phase temperature range, a refractive index anisotropy, and a dielectric anisotropy that were comparable to those of the composition prepared in Example 7, were prepared. The physical properties of these liquid crystal compositions were measured. Table 8 summarizes the results.

As in Example 7, VA liquid crystal display elements were each prepared using a specific one of the liquid crystal compositions prepared in Comparative Examples 4 and 5, and evaluations of image sticking, droplet traces, process compatibility, and low-temperature solubility were made. Table 8 also summarizes the results.

TABLE 8

| Comparative example 4 | | Comparative example 5 | |
| --- | --- | --- | --- |
| 3-Ph-Ph5-O2 | 9.5% | 3-Cy-Cy-V | 10.0% |
| 3-Cy-Cy-Ph5-O2 | 13.0% | 3-Cy-Cy-Ph5-O2 | 13.0% |
| 3-Cy-Cy-2 | 18.0% | 3-Cy-Cy-2 | 13.0% |
| 3-Cy-Cy-4 | 7.0% | 3-Cy-Cy-4 | 5.0% |
| 5-Cy-Cy-V | 11.5% | 1-Ph-Ph-2V1 | 4.0% |
| 1-Ph-Ph-2V1 | 0.5% | 3-Cy-Ph-Ph-2 | 9.0% |
| 3-Cy-Ph-Ph-2 | 7.5% | 3-Cy-Ph5-O2 | 12.0% |
| 3-Cy-Ph5-O2 | 12.0% | 5-Cy-Ph5-O2 | 12.0% |
| 2-Cy-Ph-Ph5-O2 | 5.0% | 2-Cy-Ph-Ph5-O2 | 6.0% |
| 3-Cy-Ph-Ph5-O2 | 11.0% | 3-Cy-Ph-Ph5-O2 | 11.0% |
| 3-Ph-Ph5-Ph-2 | 5.0% | 3-Ph-Ph5-Ph-2 | 5.0% |
| $T_{NI}/°$ C. | 75.7 | $T_{NI}/°$ C. | 75.9 |
| $\Delta_n$ | 0.112 | $\Delta_n$ | 0.112 |
| $n_o$ | 1.486 | $n_o$ | 1.487 |
| $\Delta\epsilon$ | −3.3 | $\Delta\epsilon$ | −3.3 |
| $\epsilon_\perp$ | 6.7 | $\epsilon_\perp$ | 7.0 |
| $\eta$/mPa · s | 18.2 | $\eta$/mPa · s | 19.9 |
| $\gamma_1$/mPa · s | 124 | $\gamma_1$/mPa · s | 129 |
| $\gamma_1/\Delta_n^2$ | 9.9 | $\gamma_1/\Delta_n^2$ | 10.3 |
| Initial voltage holding ratio/% | 98.7 | Initial voltage holding ratio/% | 98.6 |
| Voltage holding ratio at 150° C. after 1 h/% | 98.0 | Voltage holding ratio at 150° C. after 1 h/% | 97.7 |
| Image sticking evaluation | Poor | Image sticking evaluation | Poor |
| Droplet trace evaluation | Fair | Droplet trace evaluation | Poor |
| Process compatibility evaluation | Fair | Process compatibility evaluation | Fair |
| Low-temperature solubility evaluation | Fair | Low-temperature solubility evaluation | Fair |

The liquid crystal composition (Comparative Example 4) that did not include a compound represented by General Formula (I) had a liquid crystal phase temperature range, a refractive index anisotropy, and a dielectric anisotropy that were comparable to those of the liquid crystal composition (Example 7) that included 10% by mass of a compound represented by General Formula (I), but had a higher viscosity η than the liquid crystal composition prepared in Example 7. The liquid crystal composition prepared in Comparative Example 4 had a γ1 of 124 mPa·s, which was higher than that of the liquid crystal composition prepared in Example 7, that is, 112 mPa·s. Comparison of γ1/Δn², which is a parameter of the effective speed of response of a liquid crystal display element or a display, also confirmed that the liquid crystal composition prepared in Comparative Example 4 had a poor property. In Comparative Example 4, the initial VHR was 98.7% and a VHR measured after being left standing at a high temperature, that is, at 150° C. for 1 hour, was 98.0%, which were poorer results than in Example 7. The change occurred in the evaluation of process compatibility was at an unacceptable level compared with Example 7. In the evaluation of low-temperature solubility, precipitation occurred earlier than in Example 7.

The liquid crystal composition (Comparative Example 5) that did not include a compound represented by General Formula (II) had a liquid crystal phase temperature range, a refractive index anisotropy, and a dielectric anisotropy that were comparable to those of the liquid crystal composition (Example 7) that included 9.5% by mass of a compound represented by General Formula (II), but had a higher viscosity η than the liquid crystal composition prepared in Example 7. The liquid crystal composition prepared in Comparative Example 4 had a γ1 of 129 mPa·s, which was higher than that of the liquid crystal composition prepared in Example 7, that is, 112 mPa·s. Comparison of γ1/Δn², which is a parameter of the effective speed of response of a liquid crystal display element or a display, also confirmed that the liquid crystal composition prepared in Comparative Example 5 had a poor property. In Comparative Example 5, the initial VHR was 98.6% and a VHR measured after being left standing at a high temperature, that is, at 15° C. for 1 hour, was 97.7%, which were poorer results than in Example 7. The change occurred in the evaluation of process compatibility was at an unacceptable level compared with Example 7. In the evaluation of low-temperature solubility, precipitation occurred earlier than in Example 7.

Comparative Example 6

A liquid crystal composition (Comparative Example 6) not including the compound represented by Formula (IIIb-1), which was designed to have a liquid crystal phase temperature range, a refractive index anisotropy, and a dielectric anisotropy that were comparable to those of the composition prepared in Example 7, was prepared. The physical properties of the liquid crystal composition were measured. Table 9 summarizes the results.

As in Example 7, a VA liquid crystal display element was prepared using the liquid crystal composition prepared in Comparative Example 6, and evaluations of image sticking, droplet traces, process compatibility, and low-temperature solubility were made. Table 9 also summarizes the results.

TABLE 9

| Comparative example 6 | |
| --- | --- |
| 3-Cy-Cy-V | 10.0% |
| 3-Ph-Ph5-O2 | 9.5% |
| 3-Cy-Cy-2 | 18.0% |
| 3-Cy-Cy-4 | 6.5% |
| 1-Ph-Ph-2V1 | 2.0% |

TABLE 9-continued

| Comparative example 6 | |
|---|---|
| 3-Cy-Ph-Ph-2 | 8.0% |
| 3-Cy-Ph5-O2 | 12.0% |
| 4-Cy-Cy-Ph5-O2 | 12.0% |
| 2-Cy-Ph-Ph5-O2 | 6.0% |
| 3-Cy-Ph-Ph5-O2 | 11.0% |
| 3-Ph-Ph5-Ph-2 | 5.0% |
| $T_{NI}/°$ C. | 75.5 |
| $\Delta_n$ | 0.112 |
| $n_o$ | 1.488 |
| $\Delta\varepsilon$ | −3.3 |
| $\varepsilon_\perp$ | 6.9 |
| $\eta$/mPa · s | 17.2 |
| $\gamma_1$/mPa · s | 115 |
| $\gamma_1/\Delta_n^2$ | 9.2 |
| Initial voltage holding ratio/% | 98.7 |
| Voltage holding ratio at 150° C. after 1 h/% | 97.5 |
| Image sticking evaluation | Poor |
| Droplet trace evaluation | Fair |
| Process compatibility evaluation | Fair |
| Low-temperature solubility evaluation | Poor |

The liquid crystal composition (Comparative Example 6) that did not include the compound represented by Formula (IIIb-1) had a liquid crystal phase temperature range, a refractive index anisotropy, and a dielectric anisotropy that were comparable to those of the liquid crystal composition (Example 7) that included 13% by mass of the compound represented by Formula (IIIb-1), but had a higher viscosity η than the liquid crystal composition prepared in Example 7. The liquid crystal composition prepared in Comparative Example 4 had a γ1 of 115 mPa·s, which was higher than that of the liquid crystal composition prepared in Example 7, that is, 112 mPa·s. Comparison of γ1/Δn², which is a parameter of the effective speed of response of a liquid crystal display element or a display, also confirmed that the liquid crystal composition prepared in Comparative Example 6 had a poor property, but the difference in γ1/Δn² was not large. However, in Comparative Example 6, the initial VHR was 98.7% and a VHR measured after being left standing at a high temperature, that is, at 150° C. for 1 hour, was 97.5%, which were considerably poorer results than in Example 7. The change occurred in the evaluation of process compatibility was at an unacceptable level compared with Example 7. In the evaluation of low-temperature solubility, precipitation occurred earlier than in Example 7.

Examples 8 and 9

Liquid crystal compositions (Examples 8 and 9) including the following components, which were designed to have a liquid crystal phase temperature range, a refractive index anisotropy, and a dielectric anisotropy that were comparable to those of the composition prepared in Example 7, were prepared. The physical properties of the liquid crystal compositions were measured. Table 10 summarizes the results.

As in Example 7, VA liquid crystal display elements were each prepared using a specific one of the liquid crystal compositions prepared in Examples 8 and 9, and evaluations of image sticking, droplet traces, process compatibility, and low-temperature solubility were made. Table 10 also summarizes the results.

TABLE 10

| | Example 8 | | Example 9 | |
|---|---|---|---|---|
| 2-Cy-Cy-V1 | 10.0% | 3-Cy-Cy-V1 | 11.5% |
| 3-Ph-Ph5-O2 | 10.5% | 3-Ph-Ph5-O2 | 11.0% |
| 3-Cy-Cy-Ph5-O2 | 13.0% | 3-Cy-Cy-Ph5-O2 | 12.5% |

TABLE 10-continued

| | Example 8 | | Example 9 | |
|---|---|---|---|---|
| 3-Cy-Cy-2 | 18.5% | 3-Cy-Cy-2 | 19.0% |
| 3-Cy-Cy-4 | 7.0% | 3-Cy-Cy-4 | 7.0% |
| 1-Ph-Ph-2V1 | 0.5% | 1-Ph-Ph-2V1 | 1.5% |
| 3-Cy-Ph-Ph-2 | 9.0% | 3-Cy-Ph-Ph-2 | 6.5% |
| 3-Cy-Ph5-O2 | 10.5% | 3-Cy-Ph5-O2 | 10.0% |
| 2-Cy-Ph-Ph5-O2 | 6.0% | 2-Cy-Ph-Ph5-O2 | 6.0% |
| 3-Cy-Ph-Ph5-O2 | 10.0% | 3-Cy-Ph-Ph5-O2 | 10.0% |
| 3-Ph-Ph5-Ph-2 | 5.0% | 3-Ph-Ph5-Ph-2 | 5.0% |
| $T_{NI}/°$ C. | 75.8 | $T_{NI}/°$ C. | 75.8 |
| $\Delta_n$ | 0.112 | $\Delta_n$ | 0.112 |
| $n_o$ | 1.487 | $n_o$ | 1.486 |
| $\Delta\varepsilon$ | −3.3 | $\Delta\varepsilon$ | −3.3 |
| $\varepsilon_\perp$ | 6.7 | $\varepsilon_\perp$ | 6.7 |
| $\eta$/mPa · s | 16.5 | $\eta$/mPa · s | 16.5 |
| $\gamma_1$/mPa · s | 111 | $\gamma_1$/mPa · s | 114 |
| $\gamma_1/\Delta_n^2$ | 8.8 | $\gamma_1/\Delta_n^2$ | 9.1 |
| Initial voltage holding ratio/% | 99.9 | Initial voltage holding ratio/% | 99.9 |
| Voltage holding ratio at 150° C. after 1 h/% | 99.2 | Voltage holding ratio at 150° C. after 1 h/% | 99.3 |
| Image sticking evaluation | Excellent | Image sticking evaluation | Excellent |
| Droplet trace evaluation | Excellent | Droplet trace evaluation | Good |
| Process compatibility evaluation | Excellent | Process compatibility evaluation | Excellent |
| Low-temperature solubility evaluation | Good | Low-temperature solubility evaluation | Excellent |

The liquid crystal composition prepared in Example 8 had a liquid crystal phase temperature range practical as a liquid crystal composition for TVs, a dielectric anisotropy having a large absolute value, a low viscosity, and an optimal Δn. The image sticking resistance, resistance to droplet traces, process compatibility, and low-temperature solubility of the VA liquid crystal display element prepared using the liquid crystal composition described in Example 8, which were evaluated by the above-described method, were markedly high.

The liquid crystal composition prepared in Example 9 had a liquid crystal phase temperature range practical as a liquid crystal composition for TVs, a dielectric anisotropy having a large absolute value, a low viscosity, and an optimal Δn. The image sticking resistance, resistance to droplet traces, process compatibility, and low-temperature solubility of the VA liquid crystal display element prepared using the liquid crystal composition described in Example 9, which were evaluated by the above-described method, were markedly high.

Examples 10 and 11

Liquid crystal compositions (Examples 10 and 11) including the following components, which were designed to have a liquid crystal phase temperature range, a refractive index anisotropy, and a dielectric anisotropy that were comparable to those of the composition prepared in Example 7, were prepared. The physical properties of the liquid crystal compositions were measured. Table 11 summarizes the results.

As in Example 7, VA liquid crystal display elements were each prepared using a specific one of the liquid crystal compositions prepared in Examples 10 and 11, and evaluations of image sticking, droplet traces, process compatibility, and low-temperature solubility were made. Table 11 also summarizes the results.

TABLE 11

| | Example 10 | | Example 11 |
|---|---|---|---|
| 3-Cy-Cy-V | 10.0% | 2-Cy-Cy-V1 | 10.0% |
| 3-Ph-Ph5-O2 | 10.0% | 3-Ph-Ph5-O2 | 10.0% |
| 3-Cy-Cy-Ph5-O2 | 13.0% | 3-Cy-Cy-Ph5-O2 | 13.0% |
| 3-Cy-Cy-2 | 15.0% | 3-Cy-Cy-2 | 15.0% |
| 3-Cy-Cy-4 | 4.5% | 3-Cy-Cy-4 | 4.5% |
| 3-Cy-Cy-5 | 6.0% | 3-Cy-Cy-5 | 8.0% |
| 1-Ph-Ph-2V1 | 2.0% | 3-Cy-Ph-Ph-2 | 4.5% |
| 3-Cy-Ph-Ph-2 | 7.0% | 3-Cy-Ph5-O2 | 11.0% |
| 3-Cy-Ph5-O2 | 10.5% | 2-Cy-Ph-Ph5-O2 | 6.0% |
| 2-Cy-Ph-Ph5-O2 | 7.0% | 3-Cy-Ph-Ph5-O2 | 10.0% |
| 3-Cy-Ph-Ph5-O2 | 10.0% | 3-Ph-Ph5-Ph-2 | 8.0% |
| 3-Ph-Ph5-Ph-2 | 5.0% | $T_{NI}/°C$ | 75.8 |
| $T_{NI}/°C$ | 75.8 | $\Delta_n$ | 0.112 |
| $\Delta_n$ | 0.112 | $n_o$ | 1.486 |
| $n_o$ | 1.487 | $\Delta\varepsilon$ | −3.3 |
| $\Delta\varepsilon$ | −3.3 | $\varepsilon_\perp$ | 6.8 |
| $\varepsilon_\perp$ | 6.7 | $\eta$/mPa·s | 17.7 |
| $\eta$/mPa·s | 17.4 | $\gamma_1$/mPa·s | 118 |
| $\gamma_1$/mPa·s | 116 | $\gamma_1/\Delta_n^2$ | 9.4 |
| $\gamma_1/\Delta_n^2$ | 9.2 | Initial voltage holding ratio/% | 99.9 |
| Initial voltage holding ratio/% | 99.9 | Voltage holding ratio at 150° C. after 1 h/% | 99.5 |
| Voltage holding ratio at 150° C. after 1 h/% | 99.4 | Image sticking evaluation | Excellent |
| Image sticking evaluation | Excellent | Droplet trace evaluation | Excellent |
| Droplet trace evaluation | Good | Process compatibility evaluation | Good |
| Process compatibility evaluation | Excellent | Low-temperature solubility evaluation | Excellent |
| Low-temperature solubility evaluation | Good | | |

The liquid crystal composition prepared in Example 10 had a liquid crystal phase temperature range practical as a liquid crystal composition for TVs, a dielectric anisotropy having a large absolute value, a low viscosity, and an optimal Δn. The image sticking resistance, resistance to droplet traces, process compatibility, and low-temperature solubility of the VA liquid crystal display element prepared using the liquid crystal composition described in Example 10, which were evaluated by the above-described method, were markedly high.

The liquid crystal composition prepared in Example 11 had a liquid crystal phase temperature range practical as a liquid crystal composition for TVs, a dielectric anisotropy having a large absolute value, a low viscosity, and an optimal Δn. The image sticking resistance, resistance to droplet traces, process compatibility, and low-temperature solubility of the VA liquid crystal display element prepared using the liquid crystal composition described in Example 11, which were evaluated by the above-described method, were markedly high.

Example 12

A liquid crystal composition (Example 12) including the following components, which was designed to have a liquid crystal phase temperature range, a refractive index anisotropy, and a dielectric anisotropy that were comparable to those of the composition prepared in Example 7, was prepared. The physical properties of the liquid crystal composition were measured. Table 12 summarizes the results.

As in Example 7, a VA liquid crystal display element was prepared using the liquid crystal composition prepared in Example 12, and evaluations of image sticking, droplet traces, process compatibility, and low-temperature solubility were made. Table 12 also summarizes the results.

TABLE 12

| | Example 12 |
|---|---|
| 3-Cy-Cy-V1 | 10.0% |
| 3-Ph-Ph5-O2 | 11.0% |
| 3-Cy-Cy-Ph5-O2 | 13.0% |
| 3-Cy-Cy-2 | 15.0% |
| 3-Cy-Cy-4 | 5.0% |
| 3-Cy-Cy-5 | 7.0% |
| 1-Ph-Ph-2V1 | 2.0% |
| 3-Cy-Ph-Ph-2 | 5.0% |
| 3-Cy-Ph5-O2 | 11.0% |
| 2-Cy-Ph-Ph5-O2 | 6.0% |
| 3-Cy-Ph-Ph5-O2 | 10.0% |
| 3-Ph-Ph5-Ph-2 | 5.0% |
| $T_{NI}/°C$ | 75.9 |
| $\Delta_n$ | 0.112 |
| $n_o$ | 1.486 |
| $\Delta\varepsilon$ | −3.4 |
| $\varepsilon_\perp$ | 6.8 |
| $\eta$/mPa·s | 17.9 |
| $\gamma_1$/mPa·s | 121 |
| $\gamma_1/\Delta_n^2$ | 9.6 |
| Initial voltage holding ratio/% | 99.9 |
| Voltage holding ratio at 150° C. after 1 h/% | 99.3 |
| Image sticking evaluation | Good |
| Droplet trace evaluation | Excellent |
| Process compatibility evaluation | Good |
| Low-temperature solubility evaluation | Good |

The liquid crystal composition prepared in Example 12 had a liquid crystal phase temperature range practical as a liquid crystal composition for TVs, a dielectric anisotropy having a large absolute value, a low viscosity, and an optimal Δn. The image sticking resistance, resistance to droplet traces, process compatibility, and low-temperature solubility of the VA liquid crystal display element prepared using the liquid crystal composition described in Example 12, which were evaluated by the above-described method, were markedly high.

REFERENCE SIGNS LIST

1 SECOND POLARIZING PLATE
2 SECOND SUBSTRATE
3 THIN-FILM TRANSISTOR LAYER, ELECTRODE LAYER INCLUDING THIN-FILM TRANSISTOR
4 ALIGNMENT FILM
5 LIQUID CRYSTAL LAYER
6 PIXEL ELECTRODE (COMMON ELECTRODE)
7 COLOR FILTER
8 FIRST SUBSTRATE
9 FIRST POLARIZING PLATE
10 LIQUID CRYSTAL DISPLAY ELEMENT
11 GATE ELECTRODE
12 ANODE OXIDE FILM
13 GATE INSULATION LAYER
14 TRANSPARENT ELECTRODE (LAYER)
15 DRAIN ELECTRODE
16 OHMIC CONTACT LAYER
17 SEMICONDUCTOR LAYER
18 PROTECTION FILM
19A, 19B SOURCE ELECTRODE
21 PIXEL ELECTRODE
22 STORAGE CAPACITOR
23 DRAIN ELECTRODE
24 DATA WIRE
25 GATE WIRE
26 SOURCE ELECTRODE
27 GATE ELECTRODE
101 PROTECTION LAYER

The invention claimed is:
1. A liquid crystal display element which comprises an inverted-staggered type thin-film transistor, and which comprises a liquid crystal composition having a negative dielectric anisotropy, the liquid crystal composition comprising:
2% to 25% by mass of one or more compounds selected from compounds represented by General Formula (I):

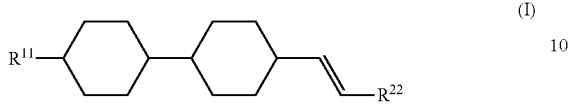
(I)

wherein $R^{11}$ represents an alkyl group having 1 to 3 carbon atoms, and $R^{22}$ represents an alkyl group having 1 to 3 carbon atoms or a hydrogen atom;

3% to 25% by mass of one or more compounds selected from compounds represented by General Formula (II):

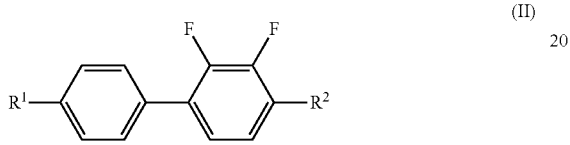
(II)

wherein $R^1$ represents an alkyl group having 1 to 8 carbon atoms and $R^2$ represents an alkoxy group having 1 to 8 carbon atoms;

5% to 25% by mass of a compound represented by Formula (IIIb-1):

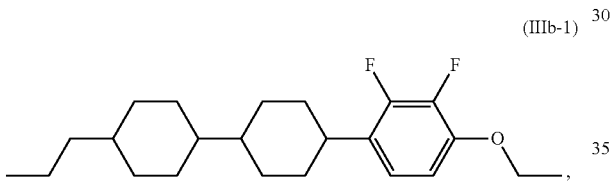
(IIIb-1)

and
19% by mass or less of at least one compound selected from compounds represented by General Formula (IV):

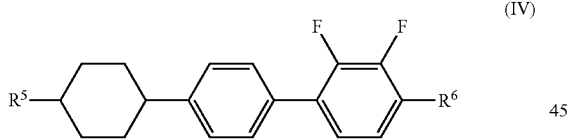
(IV)

wherein $R^5$ represent an alkyl group having 1 to 8 carbon atoms, and $R^6$ represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, 15% to 19% by mass of a compound represented by Formula (VI-a3),

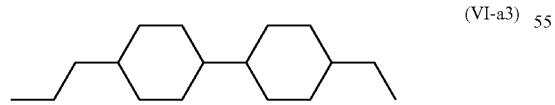
(VI-a3)

and
at least one compound selected from the group consisting of Formula (VI-c5) to (VI-c8)

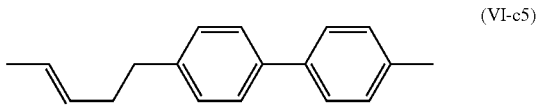
(VI-c5)

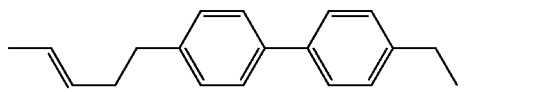
(VI-c6)

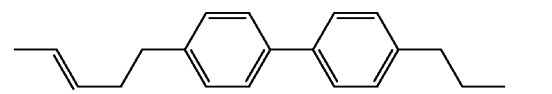
(VI-c7)

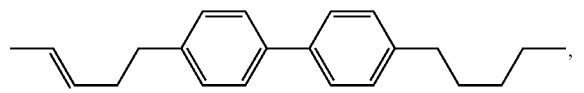
(VI-c8)

10% by mass or more of one or more compounds selected from a compound represented by General Formula (IIIa):

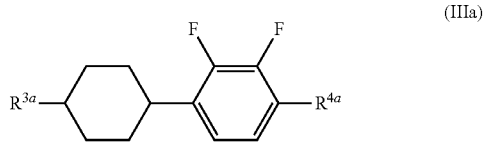
(IIIa)

wherein $R^{3a}$ and $R^{4a}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, 4.5% to 8% by mass of a compound represented by Formula (VI-a4):

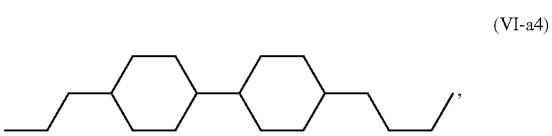 [SMILES: CCCCC1CCC(C2CCC(CCC)CC2)CC1]
(VI-a4)

and
at least one compounds selected from a compound represented by General Formula (V-5):

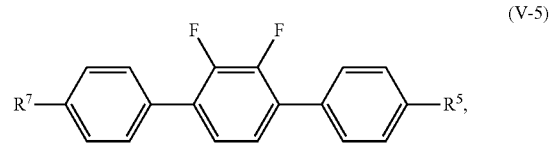
(V-5)

wherein $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, one or more hydrogen atoms of the alkyl group, alkenyl group, alkoxy group or alkenyloxy group may optionally be replaced by a fluorine atom, a methylene group of the alkyl group, alkenyl group, alkoxy group or alkenyloxy group may optionally be replaced by an oxygen atom so that oxygen atoms are not directly bonded to each other or may alternatively be replaced by a carbonyl group so that carbonyl groups are not directly bonded to each other,
wherein the liquid crystal composition does not include a compound including a cyclohexenylene ring.

2. The liquid crystal display element according to claim 1, wherein the one or more compounds selected from compounds represented by General Formula (I) are selected from compounds represented by Formulae (I-1), (I-2), and (I-3):

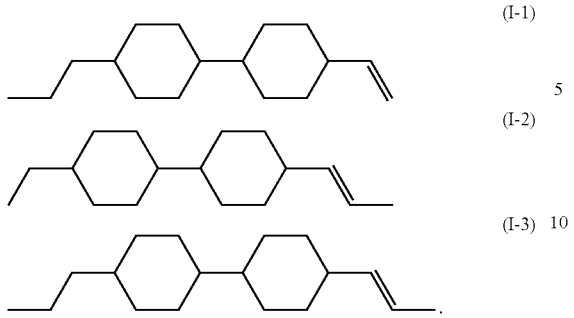

(I-1)

(I-2)

(I-3)

3. The liquid crystal display element according to claim 1, wherein the one or more compounds selected from compounds represented by General Formula (II) include a compound represented by Formula (II-1):

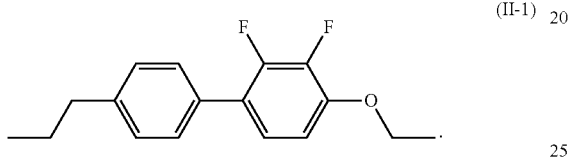

(II-1)

4. The liquid crystal display element according to claim 1, further comprising a reactive monomer.

5. The liquid crystal display element according to claim 1, wherein a voltage holding ratio of the liquid crystal composition after being left for 1 hour at 150° C. is 99.2% or more.

6. The liquid crystal display element according to claim 1, further comprising one or more compounds selected from compounds represented by General Formula (III):

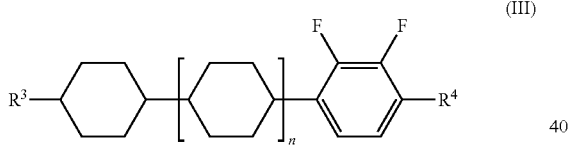

(III)

wherein $R^3$ and $R^4$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and n is 0 or 1, while a compound with $R^3$ being an alkyl group having 3 carbon atoms, $R^4$ being an alkoxy group having 2 carbon atoms, and n being 1 is not included herein, wherein the compounds represented by General Formula (III) excludes the compounds according to General Formula (IIIa).

7. The liquid crystal display element according to claim 6, further comprising a compound represented by formula (VI-c5)

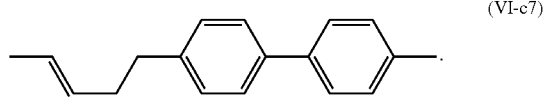

(VI-c7)

8. The liquid crystal display element according to claim 7 wherein the total content of compounds represented by General Formulae (I) and (II), Formula (IIIb-1), General Formula (III), General Formula (IV), General Formula (VI-a3), General Formula (VI-c5), Formula (VI-a4), General Formula (IIIa), General Formula (V-5), and General Formula-(VI-a) to (VI-e) is 90% by mass or more:

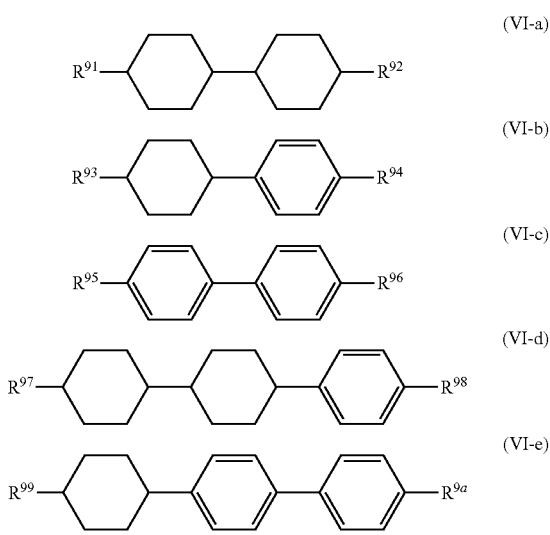

(VI-a)

(VI-b)

(VI-c)

(VI-d)

(VI-e)

in General Formulae (VI-a) to (VI-e), $R^{91}$ to $R^{9a}$ each independently represent an alkyl group having 1 to 10 carbon atoms, an alkoxy group having 1 to 10 carbon atoms, or an alkenyl group having 2 to 10 carbon atoms, while a compound represented by General Formula (VI-a) with $R^{91}$ being an alkyl group having 1 to 3 carbon atoms and $R^{92}$ being 1-alkene having 1 to 5 carbon atoms or a hydrogen atom is not included herein, and excluding a compound according to General Formula (VI-a3), (VI-a4) and (VI-c5).

9. The liquid crystal display element according to claim 1, wherein the liquid crystal composition comprises 5% to 25% by mass of one or more compounds selected from compounds represented by General Formula (I), and further comprises 25% to 45% by mass of one or more compounds selected from a compound represented by General Formula (VI-a):

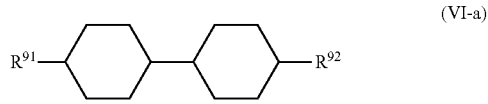

(VI-a)

in general Formulae (VI-a), $R^{91}$ to $R^{92}$ each independently represent an alkyl group having 1 to 10 carbon atoms, excluding the compounds according to general Formula (VI-a3) and general Formula (VI-a4), and one or more compounds selected from a compound represented by General Formula (VI-c):

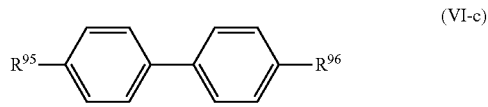

(VI-c)

in general formulae (VI-c), $R^{95}$ to $R^{96}$ each independently represent an alkyl group having 1 to 10 carbon atoms, an alkoxy group having 1 to 10 carbon atoms, or an alkenyl group having 2 to 10 carbon atoms, excluding the compounds according to general Formula (VI-c5) to general Formula (VI-c8).

10. The liquid crystal display element according to claim 9, wherein the liquid crystal composition further comprises one or more compounds selected from a compound represented by General Formula (VII):

(VII)

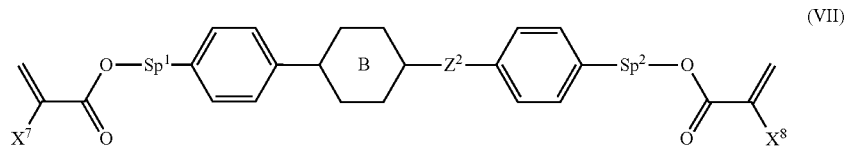

In General Formula (VII), $X^7$ and $X^8$ each independently represent a hydrogen atom or a methyl group,
$Sp^1$ and $Sp^2$ each independently represent a single bond, an alkylene group having 1 to 8 carbon atoms, or —O—$(CH_2)_s$—
where s is an integer of 2 to 7 and the oxygen atom is bonded to the aromatic ring,
$Z^2$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— where $Y^1$ and $Y^2$ each independently represent a fluorine atom or a hydrogen atom, —C≡C—, or a single bond, and
B represents a 1,4-phenylene group, a trans-1,4-cyclohexylene group, or a single bond, and any hydrogen atom of the 1,4-phenylene groups may be replaced by a fluorine atom.

11. The liquid crystal display element according to claim 9, wherein the liquid crystal composition total content of compounds represented by General Formulae (I) and (II) and Formula (IIIb-1) is 20% to 37% by mass.

* * * * *